US012634755B2

(12) United States Patent
Lou et al.

(10) Patent No.: US 12,634,755 B2
(45) Date of Patent: May 19, 2026

(54) METHODS, ARCHITECTURES, APPARATUSES AND SYSTEMS DIRECTED TO PHYSICAL LAYER SIGNALING IN A WIRELESS LOCAL AREA NETWORK ("WLAN") SYSTEM

(71) Applicant: InterDigital Patent Holdings, Inc., Wilmington, DE (US)

(72) Inventors: Hanqing Lou, Syosset, NY (US); Li Hsiang Sun, San Diego, CA (US); Rui Yang, Greenlawn, NY (US); Xiaofei Wang, North Caldwell, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 496 days.

(21) Appl. No.: 17/911,310

(22) PCT Filed: Mar. 15, 2021

(86) PCT No.: PCT/US2021/022439
§ 371 (c)(1),
(2) Date: Sep. 13, 2022

(87) PCT Pub. No.: WO2021/184024
PCT Pub. Date: Sep. 16, 2021

(65) Prior Publication Data
US 2023/0114857 A1     Apr. 13, 2023

Related U.S. Application Data

(60) Provisional application No. 62/989,551, filed on Mar. 13, 2020, provisional application No. 62/705,635, (Continued)

(51) Int. Cl.
H04W 28/06      (2009.01)
H04L 5/00       (2006.01)
H04L 27/26      (2006.01)

(52) U.S. Cl.
CPC ......... *H04W 28/065* (2013.01); *H04L 5/0044* (2013.01); *H04L 27/2602* (2013.01)

(58) Field of Classification Search
CPC ... H04W 28/04; H04W 72/04; H04W 72/042; H04W 88/08; H04W 28/065; H04L 5/0007; H04L 5/0044; H04L 27/2602
(Continued)

(56) References Cited

U.S. PATENT DOCUMENTS 11,627,029 B2 *   4/2023   Huang ................ H04L 27/2603
                                                        370/329
2005/0276347 A1   12/2005   Mujtaba et al.
(Continued)

FOREIGN PATENT DOCUMENTS

CN      106664165 A   *   5/2017   ........... H04L 5/0094
CN      106716900 A   *   5/2017   ........... H04L 5/0053
(Continued)

OTHER PUBLICATIONS

Zhou Fu et al., Research on physical layer of next generation WLAN standard IEEE 802.11ac., China. (Year: 1974).*
(Continued)

*Primary Examiner* — Nicholas A Jensen
*Assistant Examiner* — Sanjay K Dewan
(74) *Attorney, Agent, or Firm* — Mark D. Pratt

(57) ABSTRACT

Procedures, methods, architectures, apparatuses, systems, devices, and computer program products directed physical layer signaling in a wireless local area network system are provided. Among the methods is a method that may include any of generating an extremely high throughput (EHT) physical (PHY) layer protocol data unit (PDU) (PPDU) based on a PPDU format defining a preamble comprising (i) a fixed duration universal signaling (U-SIG) field, (ii) an EHT signaling (EHT-SIG) field, and (iii) an EHT short
(Continued)

training field (EHT-STF), wherein the U-SIG and EHT-SIG fields respectively comprise an extra signaling indicator and extra signaling to support a third feature; and transmitting the U-SIG and EHT-SIG fields on a first bandwidth segment, followed by the EHT-STF on any of the first bandwidth segment and a second bandwidth segment, followed by (iii) an EHT data field on any of the first and second bandwidth segments.

20 Claims, 19 Drawing Sheets

Related U.S. Application Data filed on Jul. 8, 2020, provisional application No. 63/068,929, filed on Aug. 21, 2020, provisional application No. 63/088,361, filed on Oct. 6, 2020.

(58) Field of Classification Search
USPC ........................................................ 370/329
See application file for complete search history.

(56) References Cited

U.S. PATENT DOCUMENTS

| | | | | |
|---|---|---|---|---|
| 2007/0165521 A1* | 7/2007 | Malik | ........................ | H04L 5/06 |
| | | | | 370/329 |
| 2011/0305194 A1 | 12/2011 | Zheng et al. | | |
| 2013/0176954 A1* | 7/2013 | Lv | ......................... | H04W 74/04 |
| | | | | 370/329 |
| 2013/0279446 A1* | 10/2013 | Lv | ........................... | H04L 5/001 |
| | | | | 370/329 |
| 2016/0066321 A1 | 3/2016 | Yu | | |
| 2016/0087766 A1* | 3/2016 | Sun | ........................ | H04L 5/0007 |
| | | | | 370/329 |
| 2016/0330300 A1 | 11/2016 | Josiam et al. | | |
| 2017/0006608 A1 | 1/2017 | Josiam et al. | | |
| 2017/0223693 A1 | 8/2017 | Kim et al. | | |
| 2017/0223734 A1 | 8/2017 | Lin et al. | | |
| 2017/0303280 A1 | 10/2017 | Chun et al. | | |
| 2018/0048427 A1 | 2/2018 | Lou et al. | | |
| 2018/0091632 A1 | 3/2018 | Doan et al. | | |
| 2018/0132278 A1 | 5/2018 | Oteri et al. | | |
| 2019/0097850 A1 | 3/2019 | Kenney et al. | | |
| 2020/0008185 A1 | 1/2020 | Chen et al. | | |
| 2020/0045656 A1 | 2/2020 | Verma et al. | | |
| 2021/0135779 A1 | 5/2021 | Gan et al. | | |
| 2021/0135826 A1 | 5/2021 | Yu et al. | | |
| 2023/0103807 A1* | 4/2023 | Park | .................... | H04B 7/0617 |
| | | | | 370/329 |
| 2023/0113253 A1* | 4/2023 | Park | ...................... | H04L 1/1896 |
| | | | | 370/329 |
| 2023/0122438 A1* | 4/2023 | Noh | ...................... | H04W 72/04 |
| | | | | 370/329 |
| 2023/0148403 A1* | 5/2023 | Fang | ................... | H04L 25/0202 |
| | | | | 370/329 |
| 2023/0156732 A1* | 5/2023 | Huang | ................. | H04J 11/0069 |
| | | | | 370/329 |
| 2023/0209539 A1* | 6/2023 | Yu | ....................... | H04L 27/2602 |
| | | | | 370/329 |
| 2023/0224715 A1* | 7/2023 | Huang | ............. | H04W 72/0457 |
| | | | | 370/329 |
| 2023/0239183 A1* | 7/2023 | Adachi | ................ | H04L 5/0025 |
| | | | | 370/329 |
| 2023/0239191 A1* | 7/2023 | Park | ................. | H04W 72/0453 |
| | | | | 370/329 |
| 2023/0246896 A1* | 8/2023 | Huang | ............... | H04L 27/2621 |
| | | | | 370/329 |
| 2023/0261788 A1* | 8/2023 | Lim | ..................... | H04L 1/0063 |
| | | | | 370/329 |
| 2023/0283423 A1* | 9/2023 | Kenney | ................ | H04L 5/0044 |
| | | | | 370/329 |
| 2023/0327684 A1* | 10/2023 | Park | .................... | H04L 27/2602 |
| | | | | 370/329 |

FOREIGN PATENT DOCUMENTS

| | | | | |
|---|---|---|---|---|
| CN | 107078987 A | | 8/2017 | |
| CN | 107079020 A | | 8/2017 | |
| CN | 107534897 A | * | 1/2018 | .......... H04L 1/0072 |
| CN | 107736072 A | | 2/2018 | |
| CN | 107743722 A | | 2/2018 | |
| CN | 107820683 A | | 3/2018 | |
| CN | 110708148 A | * | 1/2020 | .......... H04L 5/0053 |
| CN | 110730050 A | | 1/2020 | |
| CN | 110875817 A | | 3/2020 | |
| EP | 3107329 B1 | | 5/2020 | |

OTHER PUBLICATIONS

Lim et al., LG Electronics, 11be PPDU format, doc: IEEE 802.11-20/0019, Jan. 2020. (Year: 2020).*
Khorov et al., Current Status and Directions of IEEE 802.11be, the Future W-Fi 7, IEEE Access, May 2020. (Year: 2020).*
Edward Au, IEEE802.11 Wireless LANs, Specification Framework for TGbe, doc: IEEE 802.11-19/1262r8, Feb. 2020. (Year: 2020).*
Mengshi Hu et al., Huawei, Preamble Structure and SIG Contents, Jan. 2020, doc.: IEEE 802.11-20/0029r2. (Year: 2020).*
Laurent Cariou, "IEEE P802.11 Wireless LANs, IEEE 802.11 EHT draft Proposed CSD", IEEE 802.11-12/1077r07 (formerly IEEE 802.11-18/1233r4), Mar. 3, 2019, 7 pages.
Vermani et al., "Preamble Design Harmonization," IEEE 802.11-19/1021r1, Jun. 2019, 5 pages.
Khorov et al., "Current Status and Directions of IEEE 802.11be, the Future Wi-Fi 7", IEEE Access, May 21, 2020, 25 pages.
"IEEE Standard for Information technology—Telecommunications and information exchange between systems. Local and metropolitan area networks—Specific requirement. Part 11: Wireless LAN Medium Access Control (MAC) and Physical Layer (PHY) Specifications", IEEE Std 802.11-2016 (Revision of IEEE Std 802.11-2012), Dec. 7, 2016, 3534 pages.
Dongguk et al.; "11be PPDU format", IEEE 802.11-20/0019, Jan. 2020, 22 pages.
Sun et al., "IEEE P802.11 Wireless LANs, IEEE 802.11 NGV Proposed CSD", IEEE 802.11-18/0862r3, Jul. 2018, 7 pages.
Shilo et al., "Revisiting HARQ Complexity", IEEE 802.11-19/1923-01-0be, Jan. 2020, 14 pages.
Hu et al., "Preamble structure and SIG contents", IEEE 802.11-20/0029r2, Jan. 11, 2020, 22 pages.
Azizi et al., "IEEE P802.11 Wireless LANs, A PAR Proposal for Wake-up Radio," IEEE 802.11-16/1045r9, Nov. 2016, 4 pages.
Laurent Cariou, "IEEE P802.11 Wireless LANs, 802.11 EHT Proposed PAR", IEEE 802.11-18/0xxxr04 (formerly IEEE 802.11-18/1231r4), Jan. 11, 2019, 4 pages.
IEEE P802.11ax™/D3.0, Draft Standard for Information technology—Telecommunications and information exchange between systems Local and metropolitan area networks—Specific requirement, Part 11: Wireless LAN Medium Access Control (MAC) and Physical Layer (PHY) Specifications Amendment 6: Enhancements for High Efficiency WLAN, Jun. 2018, 682 pages.
Sun et al., "IEEE P802.11 Wireless LANs, 802.11 NGV Proposed PAR", IEEE 802.11-18/0861r9, Nov. 2018, 5 pages.
Sadeghi et al., "IEEE P802.11 Wireless LANs, 802.11bd Specification Framework Document", IEEE 802.11-15/0132r07, Sep. 2020, 12 pages.
Edward AU, "IEEE P802.11 Wireless LANs, Specification Framework for TGbe", IEEE 802.11-19/1262r8, Feb. 11, 2020, 20 pages.
Yingying, "Optimization Design of MAC Layer Protocol on IEEE 802.11ax", Thesis defense date May 19, 2018, Huazhong University of Science & Technology, published on Jun. 15, 2019, 102 pages.
Chun Zhou, "Research on physical layer of next generation WLAN standard IEEE 802.11ac", Wireless Internet Technology, No. 15, Sep. 4, 2017, 4 pages.
Wei-rong An, An-min Mo, H J Helget, "Common Channel Signaling", Computer Engineering and Design, No. 06, Dec. 28, 1993, 29 pages.

* cited by examiner

Example of Unsynchronized Multi-segment Aggregated PPDU Transmissions

Example of Unsynchronized C-OFDMA Transmissions

Example PPDU with E-SIG Fields Transmitted with a First Numerology and Before EHT-STF/LTF Fields Example PPDU with E-SIG Field Transmitted a Second Numerology and After EHT-STF/LTF Fields Example U-SIG/EHT-SIG and E-SIG Fields for Supporting HARQ Transmissions Example U-SIG/EHT-SIG and E-SIG Fields for Supporting C-MAP Transmissions

1100

1103                    1103                    Reserve or "No More" Indication

One SIG Field      One SIG Field      One SIG Field 1203                                              1200

Additional Feature
Indication Bits

One SIG Field                    One SIG Field

Example PPDUs with E-SIG

Example Transmission Scheme for C-MAP PPDU

Example Transmission Scheme for C-MAP PPDU

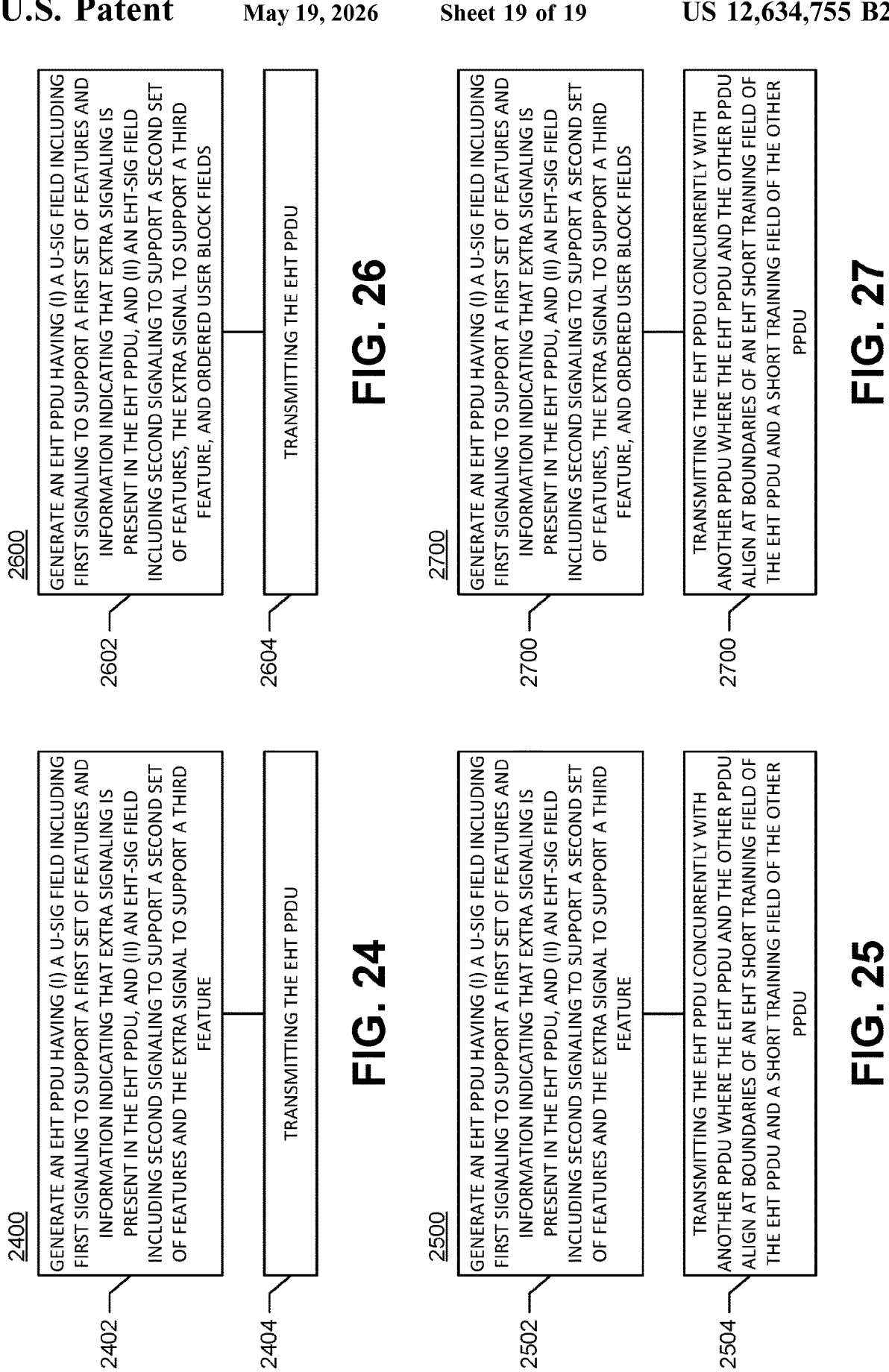

2400

2402 — GENERATE AN EHT PPDU HAVING (I) A U-SIG FIELD INCLUDING FIRST SIGNALING TO SUPPORT A FIRST SET OF FEATURES AND INFORMATION INDICATING THAT EXTRA SIGNALING IS PRESENT IN THE EHT PPDU, AND (II) AN EHT-SIG FIELD INCLUDING SECOND SIGNALING TO SUPPORT A SECOND SET OF FEATURES AND THE EXTRA SIGNAL TO SUPPORT A THIRD FEATURE

2404 — TRANSMITTING THE EHT PPDU

2502 — GENERATE AN EHT PPDU HAVING (I) A U-SIG FIELD INCLUDING FIRST SIGNALING TO SUPPORT A FIRST SET OF FEATURES AND INFORMATION INDICATING THAT EXTRA SIGNALING IS PRESENT IN THE EHT PPDU, AND (II) AN EHT-SIG FIELD INCLUDING SECOND SIGNALING TO SUPPORT A SECOND SET OF FEATURES AND THE EXTRA SIGNAL TO SUPPORT A THIRD FEATURE

2504 — TRANSMITTING THE EHT PPDU CONCURRENTLY WITH ANOTHER PPDU WHERE THE EHT PPDU AND THE OTHER PPDU ALIGN AT BOUNDARIES OF AN EHT SHORT TRAINING FIELD OF THE EHT PPDU AND A SHORT TRAINING FIELD OF THE OTHER PPDU

2602 — GENERATE AN EHT PPDU HAVING (I) A U-SIG FIELD INCLUDING FIRST SIGNALING TO SUPPORT A FIRST SET OF FEATURES AND INFORMATION INDICATING THAT EXTRA SIGNALING IS PRESENT IN THE EHT PPDU, AND (II) AN EHT-SIG FIELD INCLUDING SECOND SIGNALING TO SUPPORT A SECOND SET OF FEATURES, THE EXTRA SIGNAL TO SUPPORT A THIRD FEATURE, AND ORDERED USER BLOCK FIELDS

2604 — TRANSMITTING THE EHT PPDU

2700 — GENERATE AN EHT PPDU HAVING (I) A U-SIG FIELD INCLUDING FIRST SIGNALING TO SUPPORT A FIRST SET OF FEATURES AND INFORMATION INDICATING THAT EXTRA SIGNALING IS PRESENT IN THE EHT PPDU, AND (II) AN EHT-SIG FIELD INCLUDING SECOND SIGNALING TO SUPPORT A SECOND SET OF FEATURES, THE EXTRA SIGNAL TO SUPPORT A THIRD FEATURE, AND ORDERED USER BLOCK FIELDS

2700 — TRANSMITTING THE EHT PPDU CONCURRENTLY WITH ANOTHER PPDU WHERE THE EHT PPDU AND THE OTHER PPDU ALIGN AT BOUNDARIES OF AN EHT SHORT TRAINING FIELD OF THE EHT PPDU AND A SHORT TRAINING FIELD OF THE OTHER PPDU

FIG. 27

METHODS, ARCHITECTURES, APPARATUSES AND SYSTEMS DIRECTED TO PHYSICAL LAYER SIGNALING IN A WIRELESS LOCAL AREA NETWORK ("WLAN") SYSTEM

CROSS-REFERENCE TO RELATED APPLICATIONS

This application is a U.S. National Stage Application under 35 U.S.C. § 371 of International Patent Application No. PCT/US2021/022439, filed Mar. 15, 2021, which claims the benefit of U.S. Provisional Patent Application Nos. (i) 62/989,551 filed 13 Mar. 2020, (ii) 62/705,635 filed 8 Jul. 2020, (iii) 63/068,929 filed 21 Aug. 2020, and (iv) 63/088,361 filed 6 Oct. 2020; each of which is incorporated herein by reference.

BACKGROUND

The present disclosure is generally directed to the fields of communications, software and encoding, including, for example, to methods, architectures, apparatuses, systems directed to physical layer signaling in a wireless local area network ("WLAN") system.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein:

FIG. 1E is a block diagram illustrating various example elements of the example communications system;

FIG. 1F is a block diagram illustrating an example architecture of the example communications system;

FIGS. 24-27 are flow charts illustrating an example flows for performing EHT PPDU transmissions.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
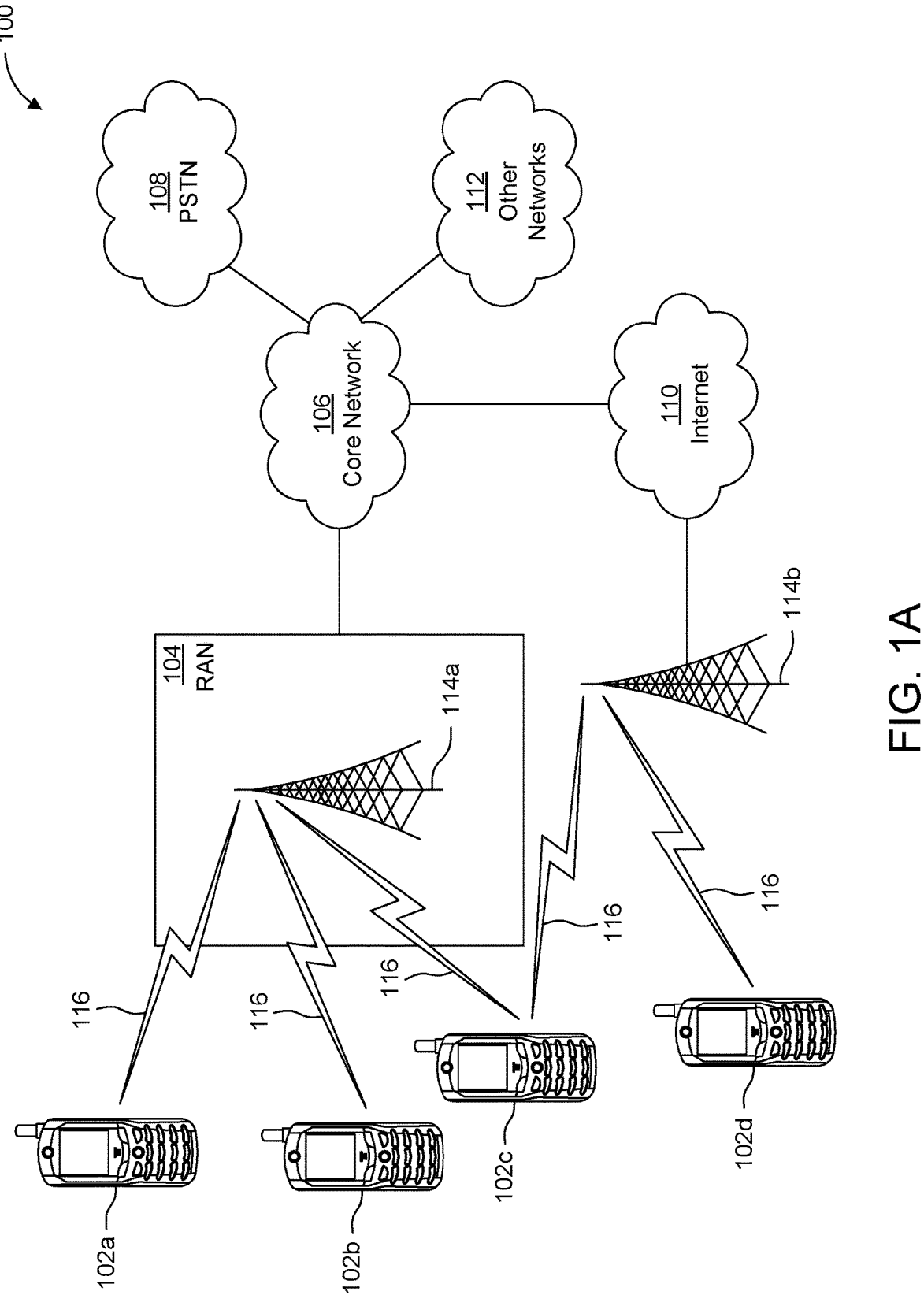
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
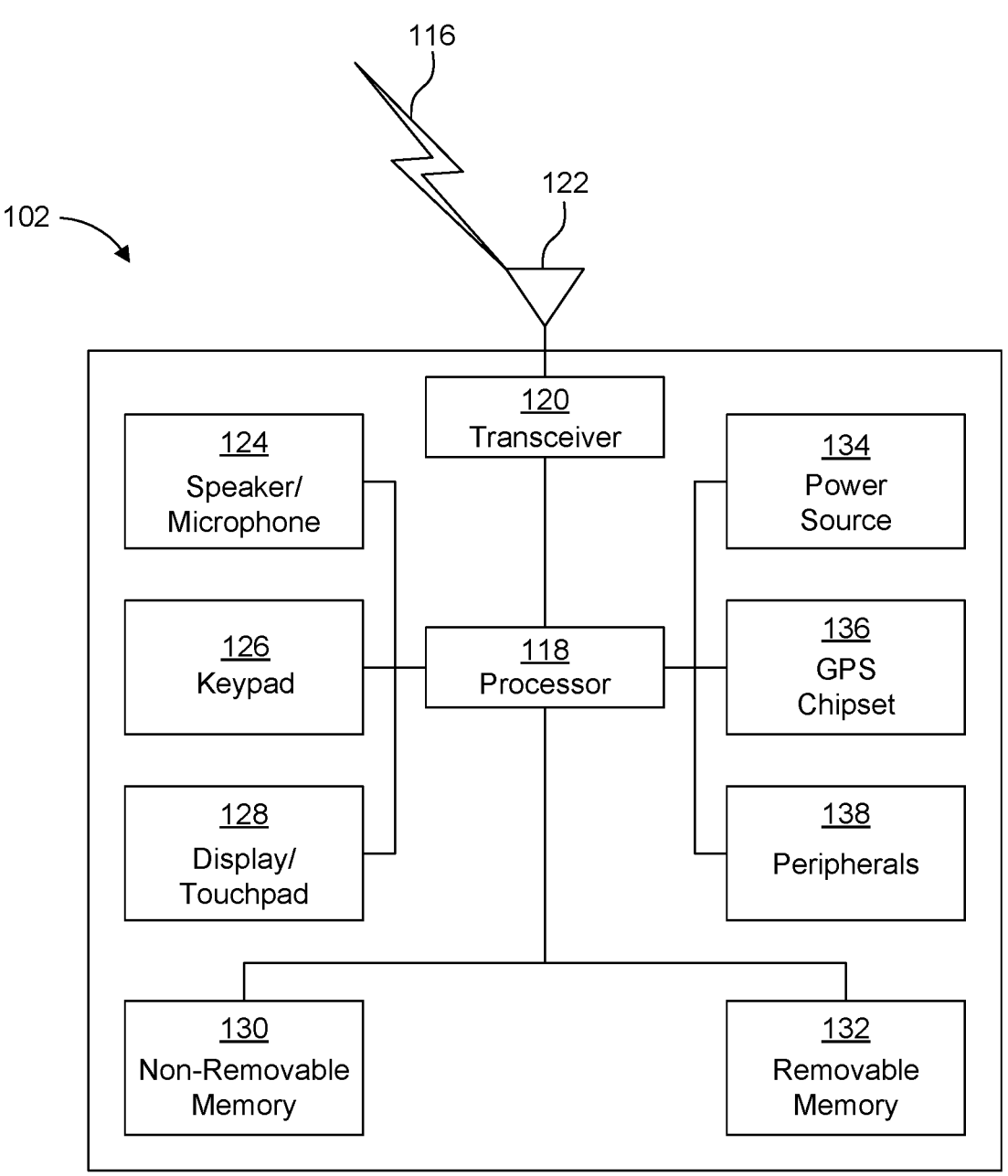
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
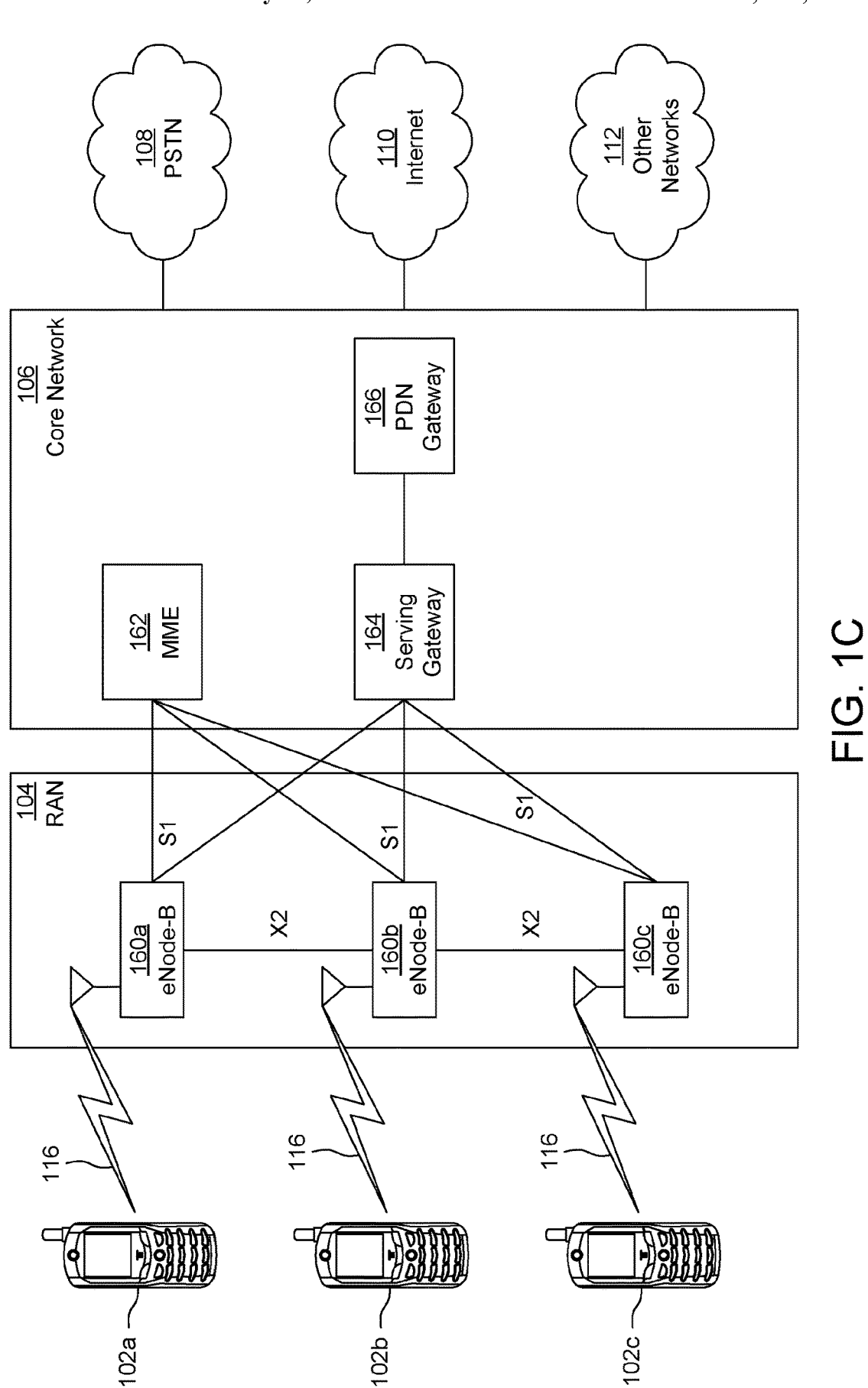
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
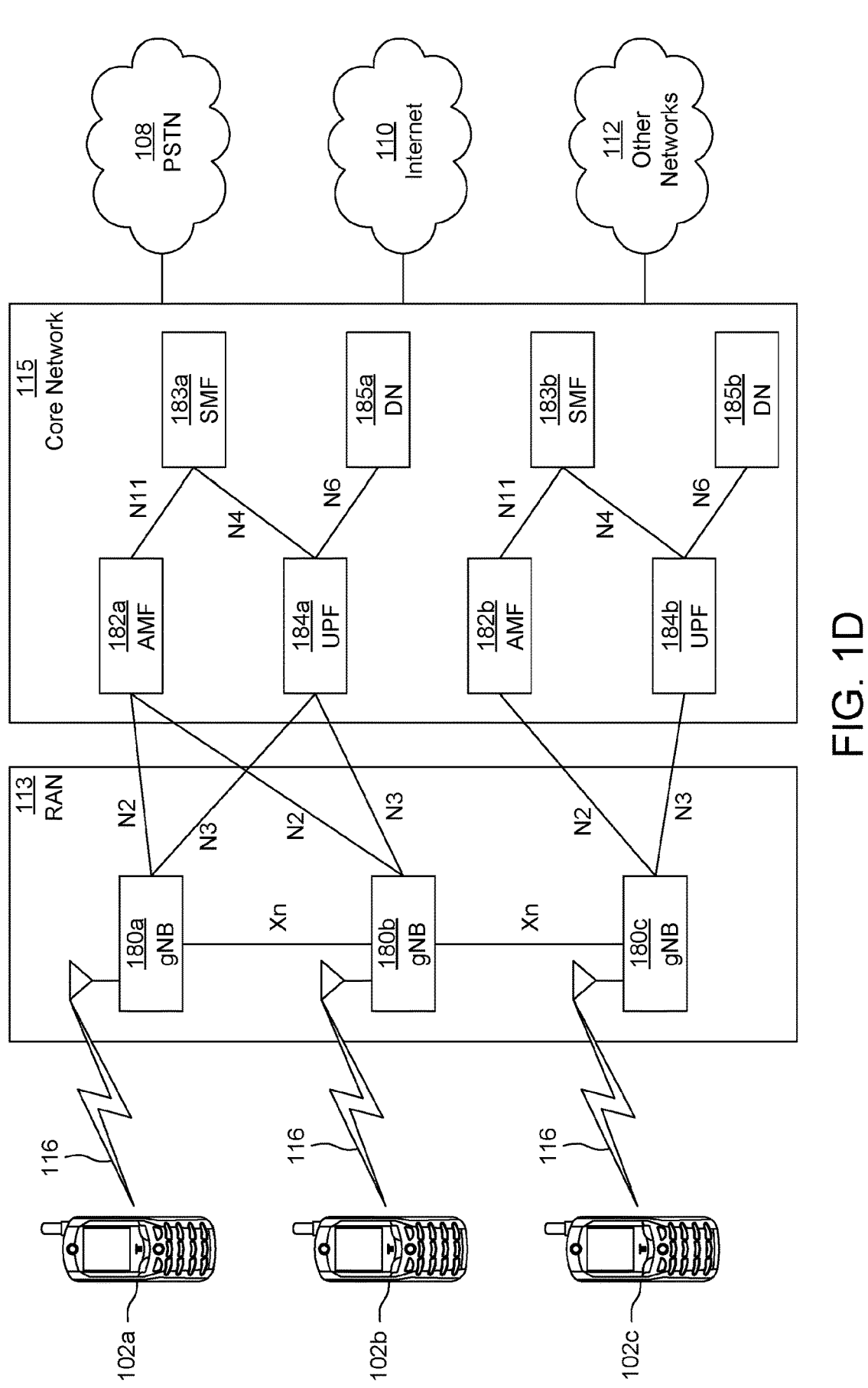
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/ device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Overview

A WLAN in infrastructure basic service set (BSS) mode has an access point (AP) for the BSS and one or more stations (STAs) associated with the AP. The AP typically has access and/or an interface to a distribution system (DS) or another type of wired/wireless network that carries traffic to and from of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may be sent through the AP where the source STA sends traffic to the AP and the AP delivers the traffic to the destination STA.

Using the IEEE 802.11ac infrastructure mode of operation, the AP may transmit a beacon on a fixed channel, usually the primary channel. This channel may be 20 MHz wide ("20 MHz channel"), and may be the operating channel of the BSS. The 20 MHz channel may be used by the STAs to establish a connection with the AP.

In an IEEE 802.11 complaint system, the channel access mechanism is carrier sense multiple access with collision avoidance (CSMA/CA). Pursuant to CSMA/CA, every STA, including the AP, will sense the primary channel. If the primary channel is detected to be busy, the STA backs off. Hence only one STA may transmit at any given time in a given BSS.

In IEEE 802.11n, high throughput (HT) STAs may use a 40 MHz wide channel ("40 MHz channel") for communication. The 40 MHz channel has a contiguous 40 MHz bandwidth (BW) resulting from a combination of the primary 20 MHz channel and an adjacent 20 MHz channel.

In IEEE 802.11ac, very high throughput (VHT) STAs may support 20 MHz, 40 MHz, 80 MHz, and 160 MHz wide channels. The 40 MHz and 80 MHz channels are combinations of two and four contiguous 20 MHz channels, respectively. The 160 MHz channel is either a combination of 8 contiguous 20 MHz channels or a combination of two non-contiguous 80 MHz channels. The latter may be referred to as an 80+80 configuration. For the 80+80 configuration, the data, after channel encoding, is passed through a segment parser that divides it into two streams. IFFT and time domain processing are done on each stream separately. The streams are mapped on to the two non-contiguous 80 MHz channels and the data is transmitted. At a receiver, this processing is reversed, and the combined data is sent to a MAC entity/layer.

To improve spectral efficiency among other reasons, IEEE 802.11ac introduced a scheme for downlink Multi-User (MU) multiple-input-multiple-output (MIMO) (MU-MIMO) transmission to multiple STAs in the same symbol time frame, e.g., during a downlink OFDM symbol. The potential for the use of downlink MU-MIMO is also currently considered for IEEE 802.11ah. It is important to note that since downlink MU-MIMO, as it is used in IEEE 802.11ac, uses the same symbol timing to multiple STAs, interference of the waveform transmissions to multiple STAs is not an issue. However, all STAs involved in MU-MIMO transmission with the AP must use the same channel or band. This limits the operating bandwidth to the smallest channel bandwidth that is supported by the STAs that are included in the MU-MIMO transmission with the AP.

IEEE 802.11ax defines a physical layer specification and medium access control layer specification that enables high efficiency (HE) operation for IEEE 802.11 devices. IEEE 802.11ax is considered a next main generation of Wi-Fi after IEEE 802.11ac. IEEE 802.11ax defines a (e.g., a new) numerology having a smaller subcarrier spacing than legacy 802.11 systems, such as 11a/n/ac. DL/UL OFDMA was introduced in IEEE 802.11ax, e.g., to achieve better spectrum efficiency.

In IEEE 802.11ax, four HE physical layer (PHY) protocol data unit (PPDU) formats are supported, namely, an HE single user (SU) PPDU ("HE SU PPDU") format, an HE MU PPDU format, an HE extended range (ER) SU PPDU ("HE ER SU PPDU") format and an HE trigger-based (TB) PPDU ("HE TB PPDU") format; examples of which are shown in FIG. 2A-2D, respectively.

Each of the HE PPDU formats includes a preamble, a header and a data field. The preamble includes legacy (non-HE) fields followed by an HE preamble. The legacy (non-HE) fields are included for backward compatibility and coexistence with legacy (non-HE) devices. The legacy fields define a legacy (non-HE) preamble. The legacy (non-HE) preamble includes a legacy (i.e., non-HT) short training field (L-STF) field, a legacy long training field (L-LTF) and a legacy signal (L-SIG) field. Appended to the legacy (non-HE) preamble is a repeated legacy (non-HT) signal (RL-SIG) field.

The HE preamble may be decoded by 802.11ax compliant devices. The HE preamble includes HE-STF and HE-LTF patterns.

The HE header includes an HE SIG-A field. The HE SIG-A field may carry information about one or more packets to follow both in downlink and uplink, modulation and coding scheme (MCS) (e.g., modulation, modulation-coding rate, etc.), BSS color, BW, spatial stream, remaining time in transmit opportunity (TXOP), etc. The HE header may include an HE SIG-B field for formats supporting multi-user packets.

The HE-data field carries one or more PHY service data units (PSDUs). Maximum packet extension (PE) modes of duration of 8 microseconds ("μs") or 16 μs are used at the end of the 802.11ax frame.

Figure 2:
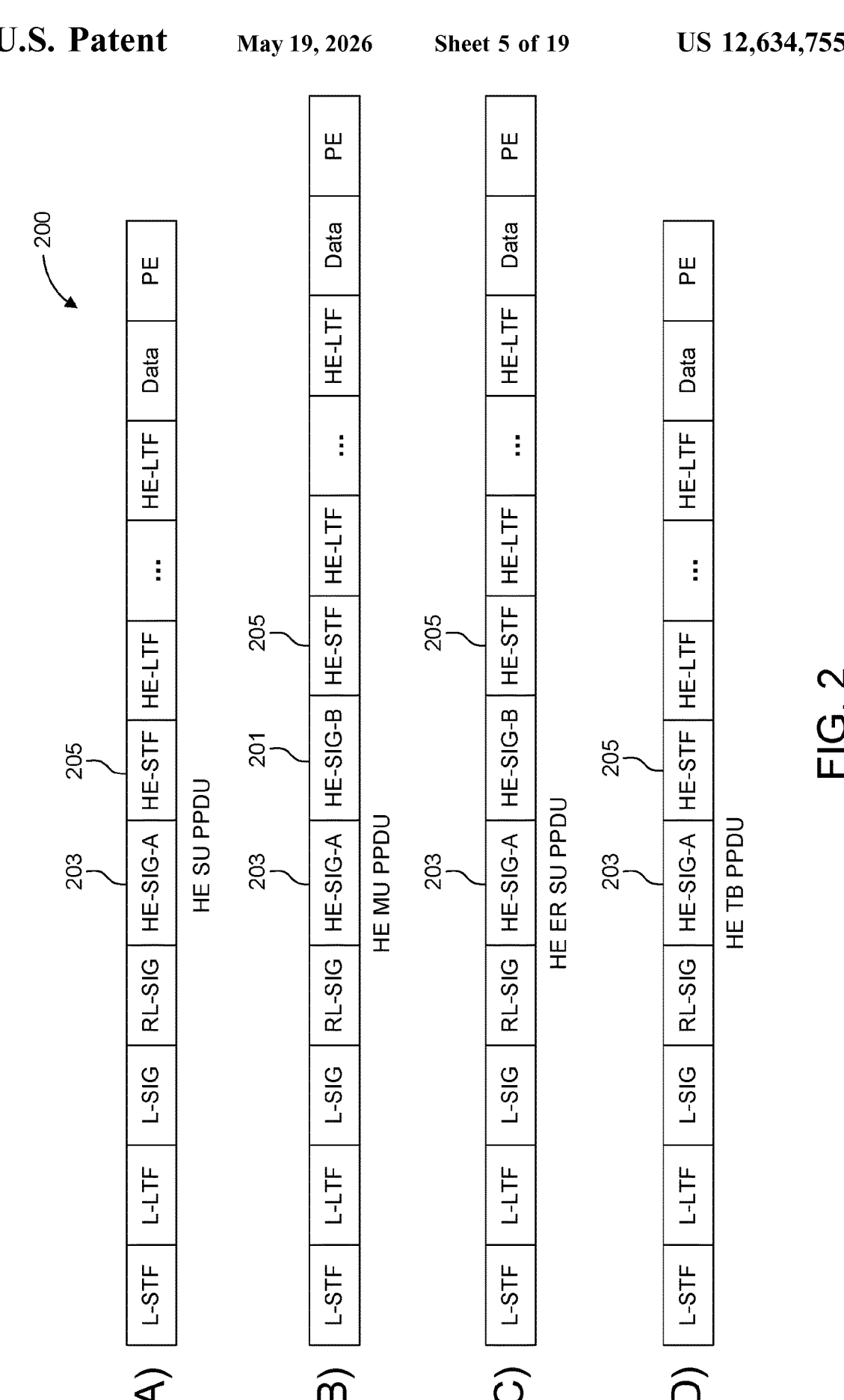
FIGS. 2A-2D illustrate example high-efficiency physical layer protocol data unit (HE PPDU) formats.

FIG. 2A illustrates an example HE SU PPDU format 200A. The HE SU PPDU format 200A may be used for single user transmission. FIG. 2B illustrates an example HE MU PPDU format 200B. The HE MU PPDU format is used for transmissions to one or more users if the PPDU is not a response of a trigger frame. The HE MU PPDU format 200B includes an HE-SIG-B field 201 in addition to an HE-SIG-A field 203.

FIG. 2C illustrates an example HE ER SU PPDU format 200C. The HE ER PPDU format 200C is used for SU transmission with extended range. In the HE ER SU PPDU format 200C, the HE-SIG-A field 203 is twice as long (in duration/symbols) as the HE-SIG-A fields in the other HE PPDU formats.

FIG. 2D illustrates an example HE TB PPDU format 200D. The HE TB PPDU format 200D is used for a transmission that is a response to a trigger frame or a frame carrying a Triggered Response Scheduling (TRS) control subfield from an AP. The HE TB PPDU format 200D defines an HE-STF field 205 having a duration of 8 μs, which is double that of the other HE PPDU formats.

The L-SIG, HE-SIG-A and HE-SIG-B fields of a PPDU carry PHY layer control information for the PPDU. The L-SIG field is transmitted using legacy (non-HE) numerology and format, so that non-HE and HE compliant STAs understand (e.g., are capable of decoding) the L-SIG field. The HE-SIG-A and HE-SIG-B fields are understood (e.g., are decodable) by HE STAs. Table 1 below lists subfields of the L-SIG field along with a length (in bits) for each (sub)field. Table 2 below lists subfields of the HE-SIG-A field along with a length (in bits) for each (sub)field for each of the HE PPDU formats 200A-200D.

TABLE 1

| L-SIG fields | |
| --- | --- |
| Field | Bits |
| Rate | 4 |
| Length | 12 |
| CRC | 1 |
| Tail | 6 |

TABLE 2

| HE-SIG-A fields with different PPDU | |
| --- | --- |
| HE SU PPDU and HE ER SU PPDU | |
| field | bits |
| format | 1 |
| Beam change | 1 |

TABLE 2-continued

| HE-SIG-A fields with different PPDU | |
| --- | --- |
| UL/DL | 1 |
| MCS | 4 |
| DCM | 1 |
| BSS color | 6 |
| Reserved | 1 |
| Spatial Reuse | 4 |
| Bandwidth | 2 |
| GI + LTF | 2 |
| NSTS and Midamble Periodicity | 3 |
| TXOP | 7 |
| Coding | 1 |
| LDPC Extra Symbol Segment | 1 |
| STBC | 1 |
| Beam formed | 1 |
| Pre-FEC Padding Factor | 2 |
| PE Disambiguity | 1 |
| Reserved | 1 |
| Doppler | 1 |
| CRC | 4 |
| Tail | 6 |

| HE MU PPDU | |
| --- | --- |
| field | bits |
| UL/DL | 1 |
| SIGB MCS | 3 |
| SIGB DCM | 1 |
| BSS Color | 6 |
| Spatial Reuse | 4 |
| Bandwidth | 3 |
| # of SIGB Symbols or MU-MIMO users' | 4 |
| SIGB Compression | 1 |
| GI + LTF size | 2 |
| Doppler | 1 |
| TXOP | 7 |
| Reserved | 1 |
| # of HE-LTF symbols and midamble periodicity | 3 |
| LDPC extra symbol segment | 1 |
| STBC | 1 |
| Pre-FEC Padding factor | 2 |
| PE disambiguity | 1 |
| CRC | 4 |
| Tail | 6 |

| HE TB PPDU | |
| --- | --- |
| field | bits |
| Format | 1 |
| BSS Color | 6 |
| Spatial Reuse 1 | 4 |
| Spatial Reuse 2 | 4 |
| Spatial Reuse 3 | 4 |
| Spatial Reuse 4 | 4 |
| Reserved | 1 |
| Bandwidth | 2 |
| TXOP | 7 |
| Reserved | 9 |
| CRC | 4 |
| Tail | 6 |

Figure 3:
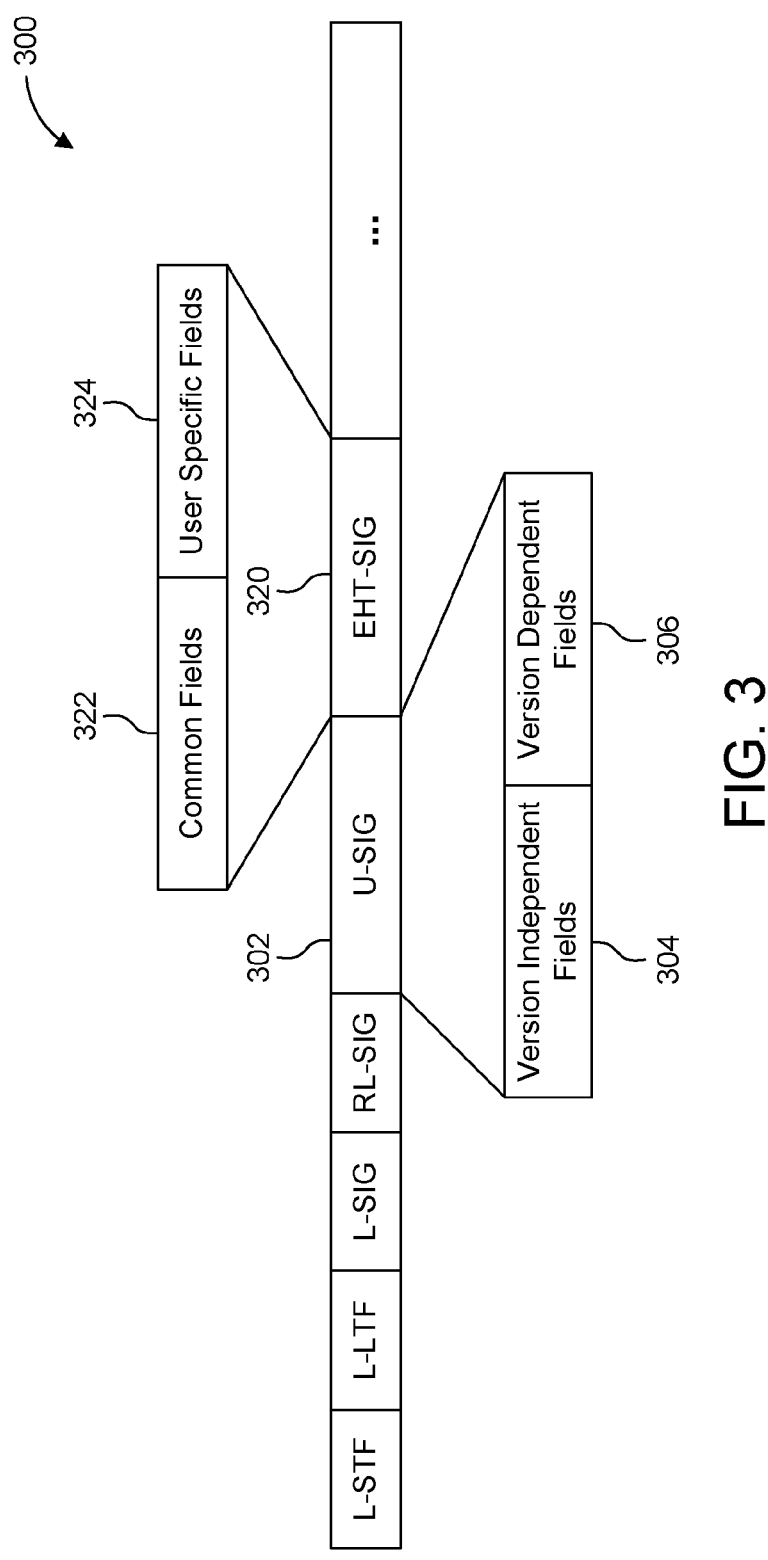
FIG. 3 illustrates an example preamble structure for an extremely high throughput (EHT) PPDU.

FIG. 3 illustrates an example preamble structure for an extremely high throughput (EHT) PPDU ("EHT-PPDU preamble structure") 300. The EHT-PPDU preamble structure 300 may be in accordance with one or more preamble structures being considered for IEEE 802.11be.

The EHT-PPDU preamble structure 300 may include a universal signal (U-SIG) field 302 and an EHT-SIG (EHT-SIG) field 320. The U-SIG field 302 may include version independent fields 304 and version dependent fields 316. The version independent fields 316 have a static location and bit definition across different (e.g., future) generations/PHY versions. The version independent fields 304 may include (e.g., bits indicating) a PHY version identifier, an UL/DL flag, a BSS color, a TXOP duration, bandwidth information, etc. The version dependent fields 304 may include (e.g., bits indicating) a PPDU type. The EHT-SIG field 320 may include common fields 322 and user specific fields 324. The common fields 322 of the EHT-SIG field 320 may include version dependent information. The version dependent information, e.g., may include information that may be associated with the version dependent fields 316 of the U-SIG field 302. The common fields 322 of the EHT-SIG field 320 may include and/or indicate a modulation and coding scheme (MCS), a number of space time streams, a guard interval (GI)+EHT-LTF side, coding, etc. The user specific fields 324 may be used in a MU configuration. IEEE 802.11be may specify a single PPDU format for both SU and MU.

As would be appreciated by a person of skill in the art based on the teachings herein, encompassed within the embodiments described herein, without limitation, are procedures, methods, architectures, apparatuses, systems, devices, and computer program products directed to physical layer signaling in WLAN system. Among the procedures, methods, architectures, apparatuses, systems, devices, and computer program products is a method that may be implemented in an AP and that may include (e.g., any of): generating an EHT PPDU based on a PPDU format defining a preamble comprising (i) a fixed duration U-SIG field, (ii) an EHT-SIG field, and (iii) an EHT short training field (EHT-STF), wherein the PPDU is generated at least in part by: inserting, into the U-SIG field, first signaling to support a first set of features and information indicating that extra signaling is present in the EHT PPDU; and inserting, into the EHT-SIG field, second signaling to support a second set of features and the extra signaling to support a third feature; and transmitting (i) at least the U-SIG and EHT-SIG fields on resources of a first bandwidth segment, followed by (ii) the EHT-STF on any of the resources of the first bandwidth segment and resources of a second bandwidth segment, followed by (iii) an EHT data field on any of the resources of the first bandwidth segment and the resources of the second bandwidth segment.

In various embodiments, the method may include determining that the third feature is not supported by the first signaling and the second signaling. In various embodiments, the extra signaling may include user-specific information and/or common information. In various embodiments, the extra signaling (E-SIG) may be carried in an extra signaling (E-SIG) field inserted into the EHT-SIG field. In various embodiments the third feature may be any of a hybrid automatic repeat request (HARQ) transmission, a coordinated multi-AP (C-MAP) transmission and a midamble transmission. In various embodiments, the third feature may be any of an optional feature and a feature supported by phase two release of IEEE 802.11be and not supported by phase one release of IEEE 802.11be. In various embodiments, the third feature may be non-preamble physical layer signaling. In various embodiments, the non-preamble physical layer signaling may include one or more reference signals. In various embodiments, the reference signals may be, include, be part of, or form a midamble.

In various embodiments, the method may include transmitting the EHT PPDU such that the EHT PPDU and another PPDU being transmitted concurrently with the EHT PPDU align at boundaries of the EHT-STF and a STF of the other PPDU.

In various embodiments, the method may include transmitting another PPDU concurrently with the EHT PPDU, wherein at least a preamble of the other PPDU is transmitted on a subsegment of the first bandwidth segment, and wherein the EHT PPDU and the other PPDU align at first and second boundaries of the EHT-STF and the STF of the other PPDU, respectively.

In various embodiments, the method may include determining first and second durations of the EHT-SIG field and a signaling field of the other PPDU; and adjusting at least one of the first and second durations to align the EHT PPDU and the other PPDU at the first and second boundaries of the EHT-STF and the STF of the other PPDU, respectively. In various embodiments, adjusting at least one of the first and second durations prepending additional training signals to the corresponding at least one of the EHT-STF and the STF of the other PPDU. In various embodiments, the first and second boundaries may occur on an OFDM symbol boundary.

In various embodiments, generating the EHT PPDU may include generating information to null at least one subsegment of the first bandwidth segment during transmission of at least the U-SIG and EHT-SIG fields, and the method may include applying the information to null the at least one subsegment prior to and/or during transmission of the U-SIG and EHT-SIG fields on the resources of the first bandwidth segment.

In various embodiments, generating the EHT PPDU may include generating a replica of at least one of the U-SIG and EHT-SIG fields, and the method may include transmitting the replica on resources of at least one subsegment of the first bandwidth segment during transmission of the corresponding at least one of the U-SIG and EHT-SIG fields.

In various embodiments, generating the EHT PPDU may include generating a first user block field indicating a first resource unit (RU) of the first bandwidth segment allocated to a first STA; generating a second user block field indicating a second RU of the second bandwidth segment allocated to a second STA; and transmitting the EHT-SIG field comprises transmitting the second user block field followed by the first user block field.

In various embodiments, the transmission of the U-SIG and EHT-SIG fields uses a first numerology, wherein transmission of the EHT data field uses a second numerology, and wherein the first and second numerologies are different.

C-MAP transmissions may refer to concurrent transmissions between multiple APs and multiple STAs. The multiple APs may coordinate and share time/frequency resources with one or more TXOPs. For simplicity of exposition herein, the terms "sharing AP" may refer to an AP that may acquire a TXOP and start using the TXOP, and the terms "shared AP(s)" may refer to the rest of multiple APs. C-MAP transmissions may include one or more of the following types of transmissions: coordinated OFDMA transmission, coordinated sub-channel transmission, coordinated TDMA transmission and coordinated beamforming and nulling.

For a coordinated OFDMA transmission, a sharing AP may acquire the media and share it with other (shared) APs for C-MAP transmissions in an OFDMA mode. For example, the sharing AP may acquire an 80 MHz channel and the APs may transmit C-MAP transmissions using 80 MHz numerology.

For a coordinated sub-channel transmission, a sharing AP may acquire the media and share it with other (shared) APs in a sub-channel transmission mode. For example, the sharing AP may acquire an 80 MHz channel, and for C-MAP transmissions, each of the APs may transmit using 20 MHz numerology.

For a coordinated TDMA transmission, a sharing AP may acquire the media and share it with other (shared) APs in TDMA mode. For example, the sharing AP may acquire an 80 MHz channel, and for C-MAP transmissions, each of the APs may transmit using the entire 80 MHz channel but in different time slots.

For a coordinated beamforming and nulling transmission, a sharing AP may acquire the media and share it with other (shared) APs in a spatial domain. For example, the sharing AP may acquire an 80 MHz channel, and for C-MAP transmissions, each of the APs may transmit using the entire 80 MHz channel but in a different direction/space.

In 802.11be and future 802.11 amendments, many new features may be added, e.g., HARQ, multi-link, multi-AP, multi-resource units (RU), etc. Those features may be used for certain purposes or use cases, at certain times, e.g., extremely high throughput, very low latency, many users or very dense deployment, etc. However, not all of such features are needed, used, etc. at the same time. In addition, from standardization and certification perspectives, some of the features may be mandatory and some may be optional. If using traditional signaling methodology, many signaling/configuration bits in the SIG field(s) for the features that are optional and/or that not to be configured may become unnecessary overhead. Pursuant to the methodologies and technologies herein, a flexible and robust way for signaling and/or configuring features that may be optional or dynamically used (e.g., without a proliferation of PPDU formats and/or while minimizing or optimizing the number of PPDU formats) is provided.

Figure 4:
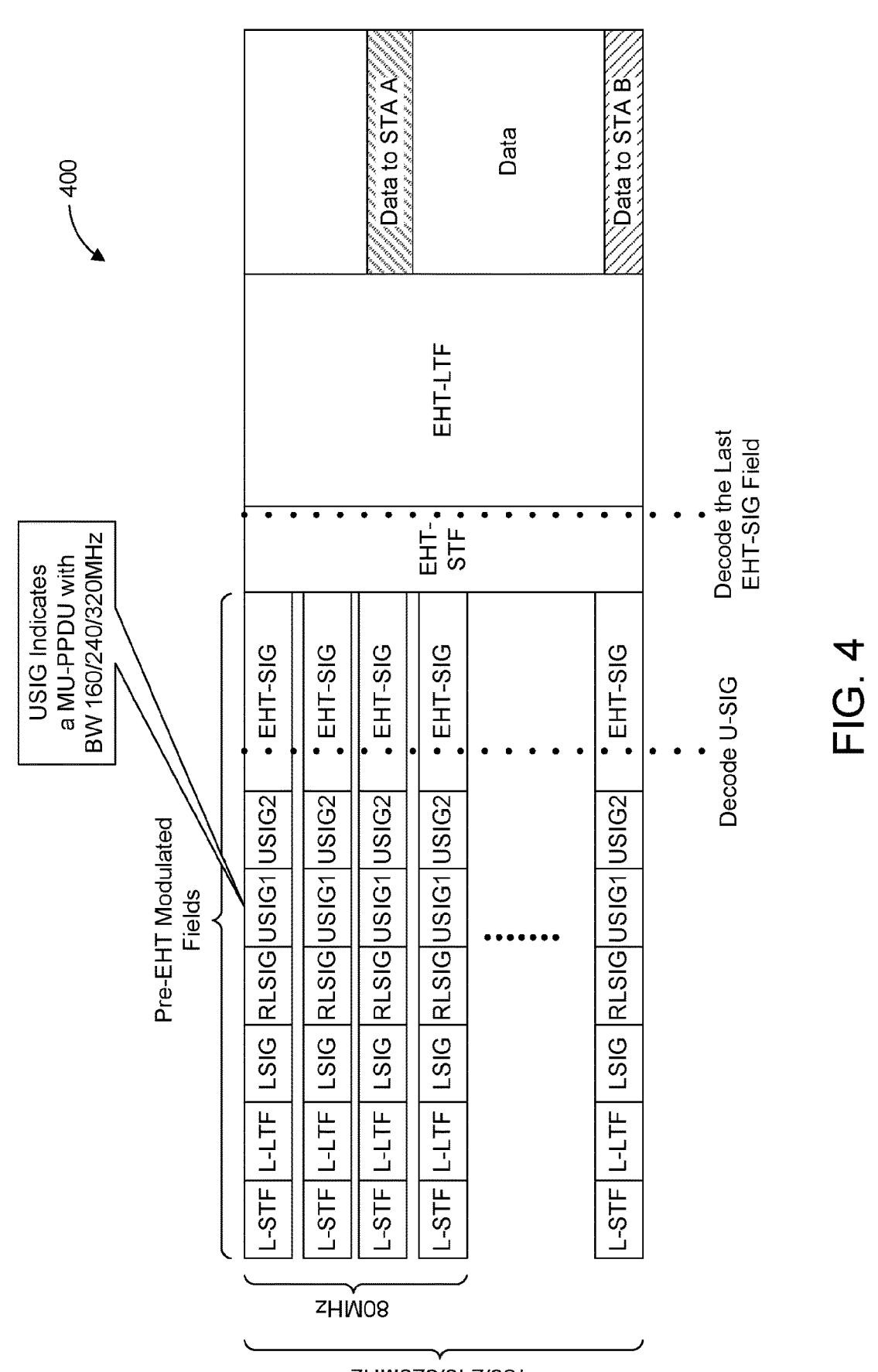
FIG. 4 illustrates an example multi-user PPDU (MU PPDU) transmission.

FIG. 4 illustrates a MU PPDU 400 occupying a bandwidth greater than 80 MHz. Although the EHT-SIG fields 420 within a primary 40 MHz band may contain complete information for a MU resource allocation, puncturing of one or more of secondary 20 MHz bands may occur. When the BSS bandwidth is greater than 80 MHz, to be able to obtain a complete EHT-SIG with puncturing, a STA may be required to receive at least the primary 80 MHz band from the start of the MU PPDU 400.

A STA may not be aware of whether it is one of the intended receivers of the MU PPDU 400. After decoding of the U-SIG and/or while receiving the EHT-SIG, a STA may determine that the bandwidth of the MU PPDU 400 is greater than 80 MHz. The STA, in turn, may adjust its receiver to receive a wider bandwidth for the EHT-STF for automatic gain control (AGC). Adjusting to the wider bandwidth may result in greater energy consumption and may interrupt reception of the EHT-SIG. Adjusting to a wider bandwidth for reception may be necessary for a STA allocated with one or more resource units (RUs) spanning (or in) both of the primary 80 MHz and secondary 80 MHz bands. Alternatively, adjusting to a wider bandwidth for reception might not be necessary for a STA allocated RUs of one of the primary band, the secondary band, or other bandwidth segment having a bandwidth similar in size to (or smaller than) the primary band. For example, adjusting to a wider bandwidth may be unnecessary for scheduled STAs A, B and an unscheduled STA C. The scheduled STAs A, B and unscheduled STA C may perform AGC and subsequent receptions for a bandwidth less than or equal to the primary 80 MHz band. As an example, the STA B may switch its receive bandwidth to a bandwidth in the secondary 80 MHz band before receiving the EHT-STF, and STAs A, C may finish reception of the EHT-SIG in the primary 80 MHz band and perform AGC without changing their receive bandwidth. This and like-type behavior may be enabled pursuant to the methodologies and technologies herein, including improved EHT-SIG.

Figures 5, 6:
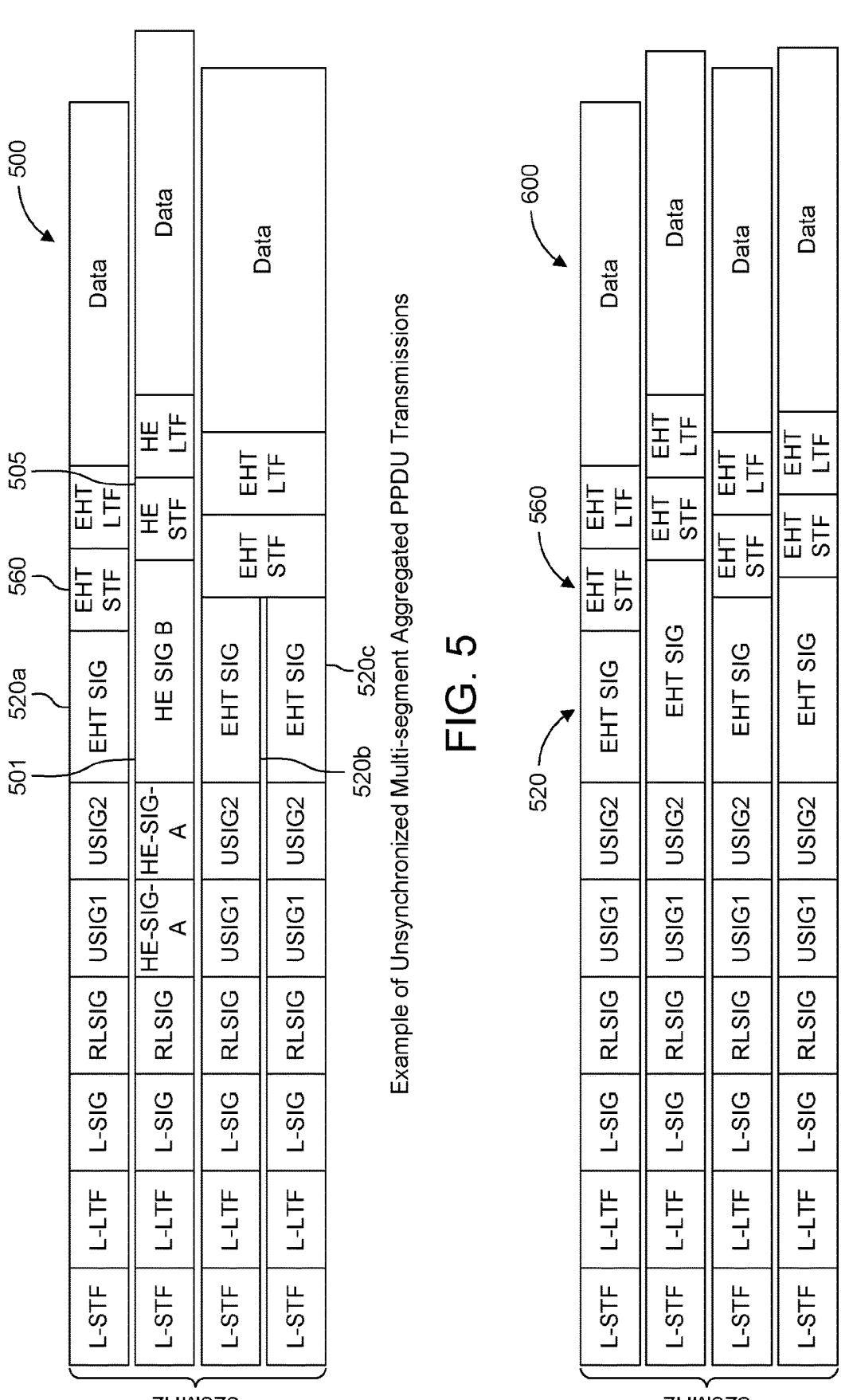
FIG. 5 illustrates example multi-segment aggregated PPDU transmissions.
FIG. 6 illustrates an example coordinated multi-AP (C-MAP) transmission.

FIGS. 5 and 6 illustrate an example of unsynchronized multi-segment aggregated PPDU transmissions 500 and an example of unsynchronized coordinated OFDMA (C-OFDMA) transmissions 600, respectively. As shown, concurrent transmissions of a shared TXOP may occur over multiple subchannels and/or segments and may be between (i) a single AP and multiple groups of STAs (e.g., different/distinct subchannel(s)/segment(s) per group of STAs) as in FIG. 5, or (ii) multiple APs and multiple STAs (e.g., different/distinct subchannel(s)/segment(s) per AP) as in FIG. 6. As also shown, not all of the concurrent transmissions have same the packet format (e.g., the same numerology, PPDU format, PPDU fields, etc.). The term "segment" and the terms "bandwidth segment" may be used interchangeably herein. The term "subsegment" may refer to a set of resources of a bandwidth segment.

With reference to FIG. 5, for example, an AP may acquire a channel and may assign different groups of STAs to different and/or distinct sets of one or more subchannels and/or segments thereof based on the packet formats supported by the STAs and/or other parameters (e.g., channel conditions, efficient use of bandwidth, etc.). The channel may be a wideband channel, such as, for example, a channel having a channel bandwidth of 160 MHz, 240 MHz, 320 MHz, etc.).

With reference to FIG. 6, an AP may acquire a channel and share a TXOP with multiple APs, such that the APs use different and/or distinct sets of one or more subchannels and/or segments thereof for communication with their associated STAs. The channel may be a wideband channel, such as, for example, a channel having a channel bandwidth of 160 MHz, 240 MHz, 320 MHz, etc.).

As also shown in both FIG. 5 and FIG. 6, concurrent transmissions carried over one distinct set of one or more subchannels and/or segments are misaligned with concurrent transmissions carried over one or more other distinct sets of one or more subchannels and/or segments. The result of such misalignment is the unsynchronized multi-segment aggregated PPDU transmissions shown in FIG. 5 and the unsynchronized C-OFDMA transmissions of FIG. 6. Referring to FIG. 5, for example, an AP may obtain a wideband channel, e.g., 320 MHz channel. The wideband channel may include four subchannels/bandwidth segments, as shown. The AP may use one subchannel to communicate with STAs supporting a first packet format (e.g., a format in accordance with IEEE 802.11ax) and the rest of the subchannels to communicate with STAs supporting a second packet format (e.g., a format in accordance with IEEE 802.11be). The concurrent transmissions across all subchannels/bandwidth segments remain aligned up to the end of USIG and HE-SIG-A fields due to all using the same numerology and same size each field. The EHT-SIG fields 520a, 520b, 520c (collectively "520") and the HE SIG B field 501 may have variable sizes. Starting from EHT-STF 560 and HE STF 505, new numerology is utilized, and if the EHT-SIG fields 520 and/or HE SIG B field 505 are not synchronized, then OFDM symbol boundaries between subchannels/bandwidth segments may not be aligned.

With above mentioned schemes, each PPDU may carry OFDM symbols with different symbol duration. For example, a packet format in accordance with IEEE 802.11be, the pre-EHT preamble portion may use one numerology and the post EHT preamble portion and data fields may use another numerology. Alternatively and/or additionally, the size of pre-EHT preamble portion may be variable (e.g., assuming the size of the EHT-SIG field in pre-EHT preamble part is variable). The synchronization of the PPDUs, especially OFDM symbol boundary, may be needed to avoid inter-symbol interference. Provided pursuant to the methodologies and technologies herein are various solutions for synchronizing the concurrent transmissions of a shared TXOP. At least some of the various solutions include modes/schemes in which not all of the concurrent transmissions have same the packet format (e.g., the same numerology, PPDU format, PPDU fields, etc.). Such modes/schemes allow for efficient use of wide bandwidths for shared TXOPs In various embodiments, a MU PPDU format may include mandatory SIG fields and one or more extra SIG (E-SIG) fields. The mandatory SIG fields may be used for most transmissions and may be present in all PPDUs. The mandatory SIG fields may include, for example, the U-SIG and EHT-SIG fields. The E-SIG fields need not be present in all PPDUs, and may be optionally present in some PPDUs. In various embodiments, the E-SIG fields of a single PPDU may have different types/formats/sub-fields/sizes (or number of bits), e.g., to support different transmission modes, different features and/or transmission order (e.g., initial transmission vs retransmission).

In various embodiments, the mandatory SIG fields may include a subfield for indicating if an E-SIG field is present. In various embodiments, the E-SIG field may include a subfield for indicating a type of the E-SIG field ("E-SIG field type"). In various embodiments, the mandatory SIG fields may include a subfield for indicating a presence of an E-SIG field type (e.g., a specific E-SIG field type).

Figure 7:
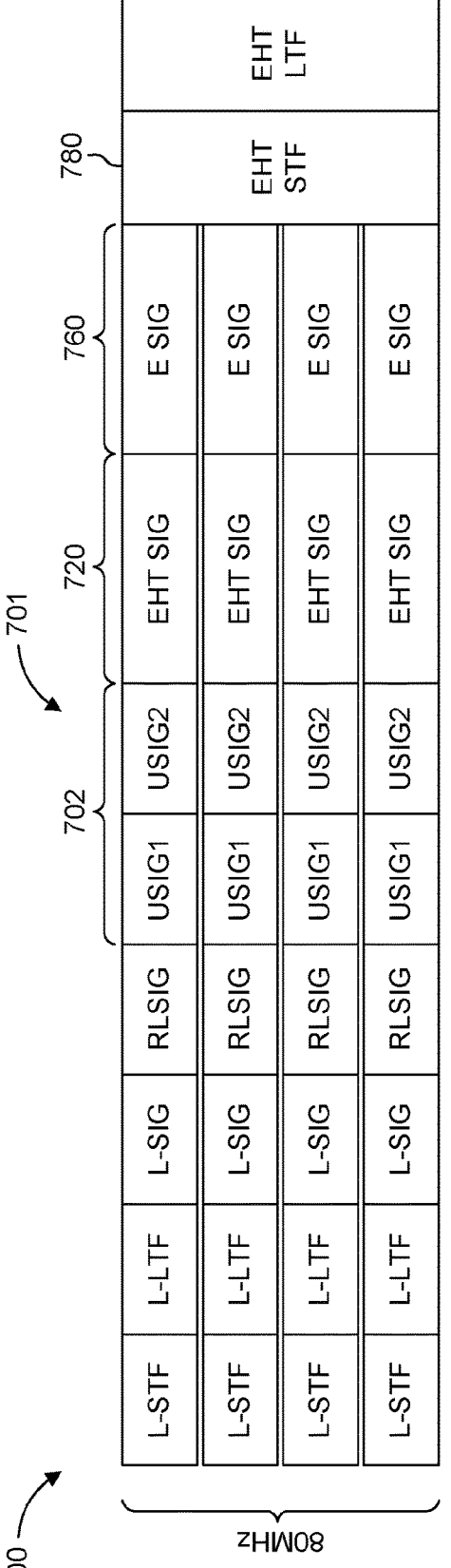
FIG. 7 illustrates an example PPDU in accordance with various embodiments.

FIG. 7 illustrates an example PPDU 700 in accordance with various embodiments. The PPDU 700 may occupy a bandwidth of 80 MHz and may include mandatory SIG fields 701 (e.g., U-SIG fields 702 and EHT-SIG fields 720) and E-SIG fields 740 transmitted (e.g., sequentially) using legacy 802.11 numerology, followed by EHT-STFs 760 and EHT-LTF fields 780 transmitted (e.g., sequentially) using a new (e.g., an EHT) numerology.

Figure 8:
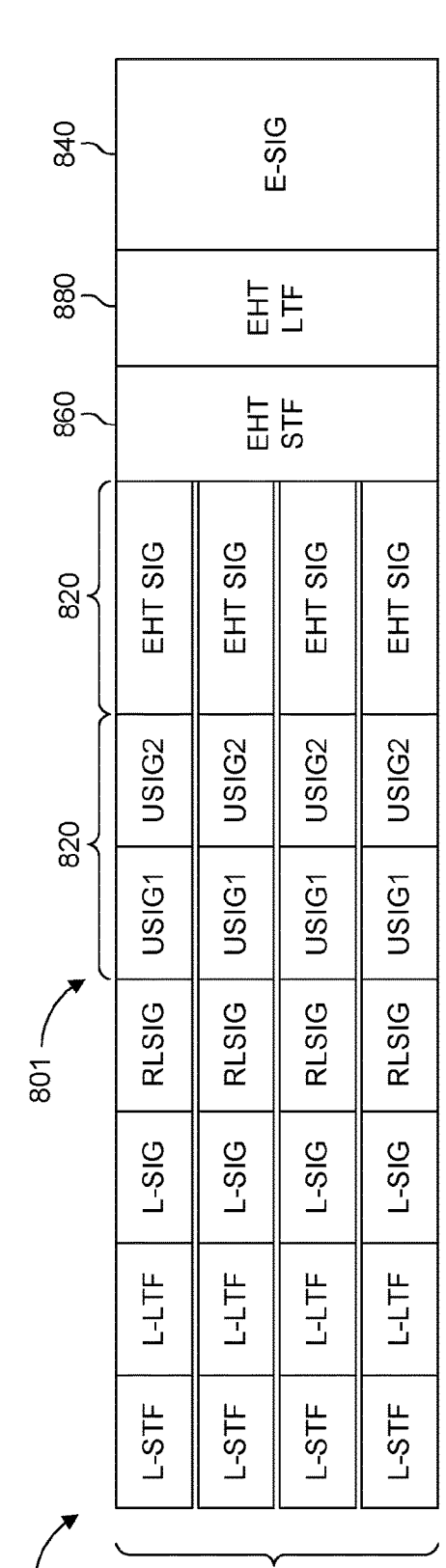
FIG. 8 illustrates an example PPDU in accordance with various embodiments.

FIG. 8 illustrates an example PPDU 800 in accordance with various embodiments. The PPDU 800 may occupy a bandwidth of 80 MHz and may include mandatory SIG fields 801 (e.g., U-SIG fields 802 and EHT-SIG fields 820) transmitted using legacy 802.11 numerology, followed by EHT-STFs 860, EHT-LTF fields 880 and E-SIG fields 840 transmitted (e.g., sequentially) using a new (e.g., an EHT) numerology Although the PPDUs of FIGS. 7 and 8 are shown and described as having 80 MHz channel bandwidths, those skilled in the art will recognize that the structure of the PPDUs may be extended to bandwidths other (e.g., greater and/or less) than 80 MHz A PPDU format having extra signaling (e.g., E-SIG fields) to support HARQ transmissions may be provided. In various embodiments, an E-SIG field may include any of a common information part and a type dependent part. In a MU communication, for instance, the type dependent part may be different for different users. In various embodiments, the common information part may include an E-SIG type subfield and the type dependent part and/or format thereof may be dependent on the E-SIG type carried in the E-SIG type subfield.

Figures 9, 10:
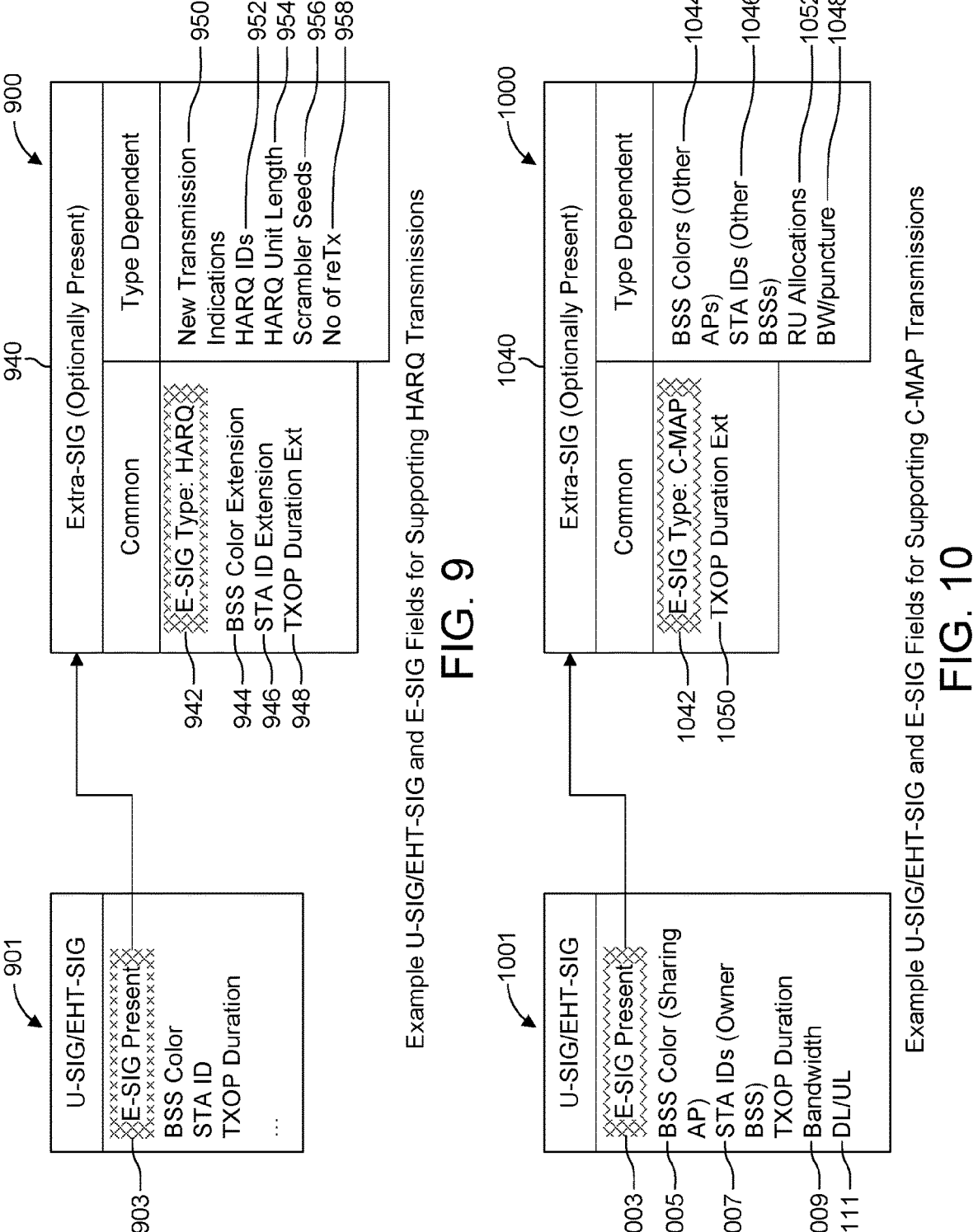
FIG. 9 illustrates example mandatory signaling (SIG) and extra signaling (E-SIG) fields of a PPDU, where the E-SIG field carries signaling to support hybrid automatic repeat request (HARQ) transmissions.
FIG. 10 illustrates example mandatory SIG and E-SIG fields of a PPDU, where the E-SIG field carries signaling to support coordinated multi-AP (C-MAP) transmission.

FIG. 9 illustrates example mandatory SIG and E-SIG fields 901, 940 of a PPDU 900, where the mandatory SIG and E-SIG fields 901, 940 carry signaling for/to support HARQ transmission. As shown, a subfield 903 any of the mandatory SIG fields 901 (e.g., any of a U-SIG and an EHT-SIG) may indicate that (or whether) an E-SIG field 940 may be present. For simplicity of exposition herein, such subfield may be referred to herein as an "E-SIG present" (sub)field. The mandatory SIG fields 901 may include other subfields (not shown).

The E-SIG field 940 may include various subfields (e.g., in its common information, type dependent and/or other parts) to support HARQ transmission. The various subfields may include any of an E-SIG type subfield 942, a BSS color extension subfield 944, a STA ID extension subfield 946, a TXOP duration extension subfield 948, a new transmission indication subfield 950, a HARQ ID subfield 952, a HARQ unit length subfield 954, a scrambler seed subfield 956 and a number of retransmissions subfield 958. The E-SIG field 940 may include other subfields (not shown).

The E-SIG type subfield 942 may indicate (e.g., set to "HARQ" to indicate) that the type of E-SIG is one configured to support HARQ transmissions and/or to support HARQ signaling. The BSS color extension subfield 944 may indicate an extended BSS color and/or a BSS ID. As an example, N1 bit BSS color and/or BSS ID may be used in a mandatory SIG field, and N2 bit BSS color and/or BSS ID extension may be used in an extended SIG field. A STA that receives such fields may combine, aggregate, concatenate, etc. the N1 and N2 bits (or portions thereof); the result of which may be a BSS color and/or BSS ID that more accurately (e.g., uniquely) identifies the BSS (e.g., a globally unique BSS color and/or BSS ID or one that uniquely identifies the BSS from within a detectable range). The E-SIG field 940 might not include the BSS color extension subfield 944, or the BSS color extension subfield 944 may have a null value depending on a density of BSSs within a detectable range. For example, if the density of BSSs within a detectable range is such that the mandatory SIG field 901 can (e.g., has enough bits to) indicate a BSS color and/or BSS ID that sufficiently (e.g., uniquely) identifies the BSS, then the BSS color extension subfield 944 may have a null value or not be transmitted.

The STA ID extension subfield 946 may carry an extended STA ID. As an example, N1 bit STA ID may be used in a mandatory SIG field 901, and N2 bit STA ID extension may be used in an extended SIG field. A STA that receives such fields may combine and/or aggregate the two IDs together to better identify the STA.

The TXOP duration extension subfield 948 may indicate an extended TXOP duration. The TXOP duration extension subfield 948 may be used in connection with a TXOP duration indicated by a mandatory SIG field 901. As an example, the mandatory SIG field 901 and the TXOP duration extension subfield 948 may carry N1 bits defining a TXOP duration T1 and N2 bits defining an extended TXOP duration T2, respectively. A STA receiving such fields may calculate a TXOP duration $T=F(T1,T2)$ such that T may be a TXOP duration with higher resolution. F(.) may be a function depending (based on) on detailed definitions of T1 and T2.

The new transmission indication subfield 950 may indicate if a HARQ transmission is a new transmission, a retransmission or a mixed transmission. A mixed transmission may carry a PSDU with A-MPDU format, where some MPDUs may be new transmissions and some MPDUs may be retransmissions. Alternatively, a mixed transmission may carry a PPDU with N codewords. Some codewords may be new transmissions and some codewords may be retransmissions. In various embodiments, the new transmission subfield may define a bitmap corresponding to N HARQ units in the PPDU. Assuming the bitmap is N bits, an absolute value or toggled value on bit n, for example, may indicate that the nth HARQ unit may be one of a new transmission and a retransmission. In various embodiments, the bitmap may include more or fewer than N bits.

The HARQ ID subfield 952 may indicate one or more HARQ process IDs. The HARQ process IDs may be used to identify HARQ transmissions between transmitter(s) and receiver(s). Each HARQ process ID may be related to a HARQ unit.

The HARQ unit length subfield 952 may indicate a length for a HARQ unit. The length may be expressed as bytes, bits or OFDM symbols. In various embodiments, the HARQ unit may be one or more MPDUs. In various embodiments, the HARQ unit may be one or more codewords.

The scrambler seed subfield 954 may carry one or more scrambler seeds. In various embodiments, the scrambler seeds may be those that were once carried in a (e.g., legacy) SERVICE field. In various embodiments, the scrambler seeds may be for the PPDU. In various embodiments, the scrambler seeds may be for one or more HARQ units (e.g., where the HARQ units may have respective scrambler seeds).

The number of retransmissions subfield 956 may indicate a number of retransmissions for the frame. For example, a "0" may indicate an initial (new) transmission, a "1" indicate a first retransmission and so on.

A PPDU format having extra signaling (e.g., in E-SIG fields) to support C-MAP transmissions may be provided. DL PPDUs transmitted by the multiple APs (e.g., C-MAP transmissions) may use a PPDU format with mandatory SIG and E-SIG fields, such as those shown in FIG. 7 and/or FIG. 8, for example.

FIG. 10 illustrates example mandatory SIG and E-SIG fields 1001,1040 of a PPDU 1000 (such as those shown in any of FIGS. 7 and 8), where the mandatory SIG and E-SIG fields 1001,1040 may carry signaling to support C-MAP transmissions. The mandatory SIG fields 1001 (e.g., any of a U-SIG and an EHT-SIG) may include an E-SIG present (sub)field 1003, a BSS color subfield 1005, a STA ID subfield 1007, a bandwidth/puncturing pattern subfield 1009 and an RU allocation subfield 1011. The mandatory SIG fields 1001 may include other subfields (not shown).

The E-SIG present (sub)field 1003 may indicate that (or whether) the PPDU 900 includes an E-SIG field 1040. The BSS color subfield 1005 may indicate a BSS color and/or ID, such as, for example. a BSS color and/or an ID for a sharing AP. The STA ID subfield 1007 may indicate one or more STA IDs, such as STA IDs of the intended receivers of a C-MAP transmission from the sharing AP. The BW/puncturing pattern subfield 1009 may indicate a total bandwidth acquired by the sharing AP for C-MAP (e.g., OFDMA) transmission. The total bandwidth indicated in the BW/puncturing pattern subfield 1009 may include BW shared to other (shared) APs. The RU allocation subfield 1011 may indicate an RU allocation for the sharing AP.

The E-SIG field 1040 may include various subfields (e.g., in its common information, type dependent and/or other parts) to support C-MAP transmissions. The various subfields may include any of an E-SIG type subfield 1042, a BSS colors subfield 1044, a STA IDs subfield 1046, a BW/puncturing pattern subfield 1048, a TXOP duration extension subfield 1050, and an RU allocation subfield 1052. The E-SIG fields 1040 may include other subfields (not shown).

The E-SIG type subfield 1042 may indicate (e.g., be set to "C-MAP" to indicate) that the type of E-SIG is one configured to support C-MAP transmissions and/or to support C-MAP signaling. The BSS colors subfield 1044 may indicate one or more BSS colors and/or IDs, such as, for example. BSS colors and/or BSS IDs for shared APs and/or individual APs not involved in the C-MAP transmission. The STA IDs subfield 1046 may indicate (i) for DL transmission (transmission from multiple APs to one or more STAs ("intended receivers"), one or more STA IDs that may represent the intended receivers of the DL transmission from shared APs and/or individual APs not involved in the C-MAP transmission; and/or (ii) for UL transmission (transmission from one or more STAs to one or more APs), one or more STA IDs that may represent the one or more transmitters of the UL transmission from the one or more STAs. The BW/puncturing pattern subfield 1048 may indicate one or more bandwidths associated to shared APs and/or individual APs not involved in the C-MAP transmission. For example, the BW/puncturing pattern subfield 1048 may indicate, for each AP involved in the transmission, a corresponding bandwidth on which to transmit.

The TXOP duration extension subfield 1050 may indicate an extended TXOP duration. The TXOP duration extension subfield 1050 may be used in connection with a TXOP duration indicated by a mandatory SIG field 1001. As an example, the mandatory SIG field 1001 and TXOP duration extension subfield 1050 may carry N1 bits defining a TXOP duration T1 and N2 bits defining an extended TXOP duration T2, respectively. A STA receiving such fields may calculate a TXOP duration $T=F(T1,T2)$ such that T may be a TXOP duration with higher resolution. F(.) may be a function depending (based on) on detailed definitions of T1 and T2.

The RU allocations subfield 1052 may indicate one or more RU allocations for the shared APs.

In various embodiments, a multi-AP group may collectively transmit a PPDU over an acquired bandwidth in which each subchannel of the acquired bandwidth, or each subchannel/subsegment of a bandwidth segment of the acquired bandwidth, carries the same content in all of the fields up to and including to mandatory SIG fields. Each AP of the multi-AP group may transmit its contribution to the PPDU on all subchannels/subsegment or on the subchannel(s)/subsegment(s) assigned to it. Unintended STAs may be able to decode U-SIG and/or EHT-SIG fields and may set corresponding network allocation vectors (NAVs) accordingly. The repetition transmission of U-SIG and/or EHT-SIG fields may improve transmission range. The APs of the multi-AP group may transmit the E-SIG field on assigned RUs and/or subchannels/subsegments, and the E-SIG field may carry AP specific information. A STA receiving the PPDU may check the BSS color and corresponding RUs/subchannel/subsegment subfields of the E-SIG field to determine the RUs/subchannels/subsegment assigned to the corresponding AP.

Figure 11:
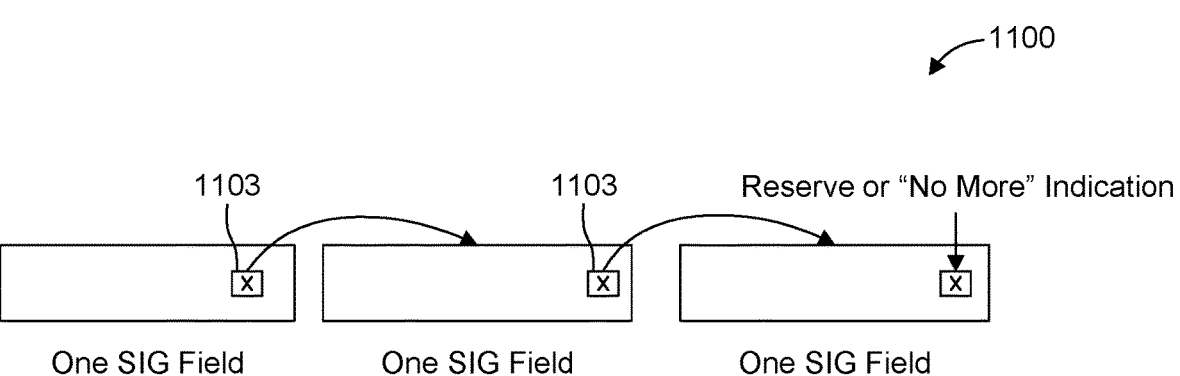
FIG. 11 illustrates an example of nested signaling.

The signaling method disclosed in connection with the PPDUs illustrated in FIGS. 9 and 10 are special cases of nested signaling. FIG. 11 illustrates an example of a nested signaling. Nested signaling may be used to make the system more scalable and support forward compatibility.

As shown, a PPDU 1100 may include n successively transmitted SIG fields. Any SIG field up to SIG field n-1 may include an indicator 1103 to indicate the existence of a following SIG field and/or one or more additional features signaled in the following SIG field. The indicator 1103 may be as small as a single bit and may be referred to as an "additional feature/SIG field indicator". PPDUs that include nesting signal may prevent proliferation of PPDU formats that would otherwise occur as additional features and capabilities are added (e.g., in future generations of Wi-Fi).

Figure 12:
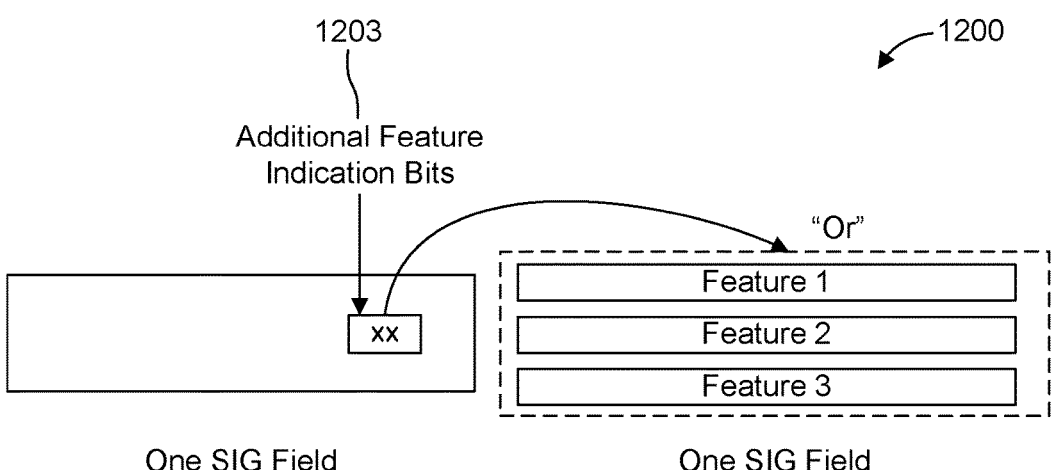
FIG. 12 illustrates an example of nested signaling.

FIG. 12 illustrates an example of nested signaling. The nested signaling of FIG. 12 is similar to the nested signaling of FIG. 11, except that, if some of the features may be used exclusively, the additional feature/SIG field indicator 1203 may be used for indicating them for one SIG field.

Figure 13:
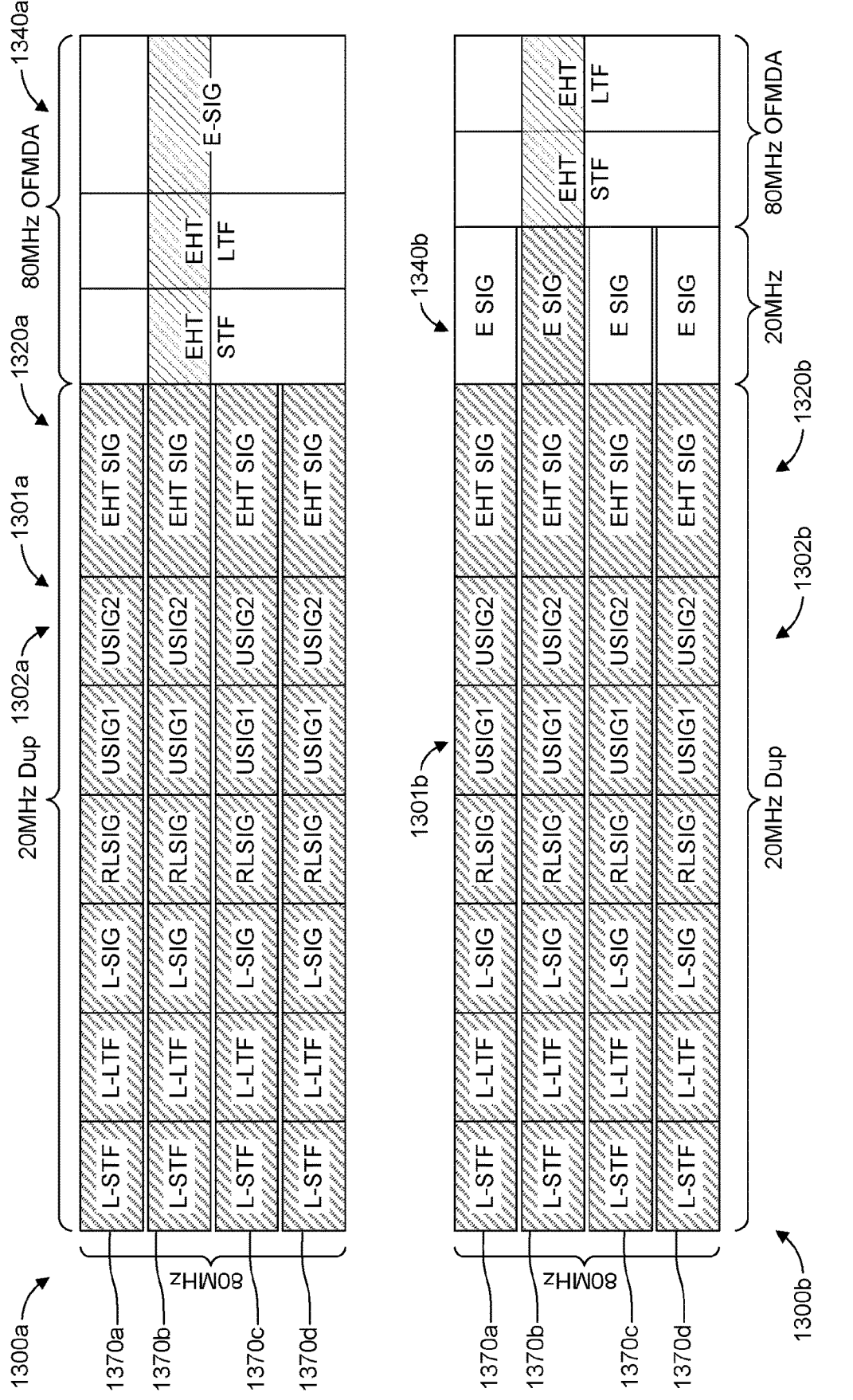
FIGS. 13a and 13b illustrate example PPDUs in which the E-SIG field carries signaling to support C-MAP transmissions.

FIGS. 13a and 13b illustrate example PPDUs 1300a, 1300b in which the mandatory SIG and E-SIG fields 1301a/b, 1340a/b carry signaling to support C-MAP transmissions. As shown in FIG. 13a (and/or 13b), the PPDU 1300a (1300b) may be transmitted over an acquired bandwidth in which each of four subchannels/bandwidth subsegments 1370a-d thereof carries the same content in all of the fields up to and including to mandatory SIG fields 1301a (1300b). The second subchannel/subsegment 1370b may be assigned to one of multiple APs ("AP 2") for the C-MAP transmissions. The AP 2 may be a shared AP and may be associated with one of multiple STAs ("STA 2"). The AP 2 may transmit the U-SIG field 1302 and/or EHT-SIG fields 1320 over the entire acquired bandwidth in each of the four subchannels/bandwidth subsegments 1370a-d. The AP 2 may transmit the E-SIG field 1340 on an assigned subchannel/bandwidth subsegment, e.g., the second subchannel/subsegment 1370b. The STA 2 may decode a BSS color related to the AP 2 from the BSS color subfield carried in the E-SIG field 1340 transmitted on the second subchannel/subsegment 1370b. The STA 2 may determine that the AP 2 may use the second subchannel/subsegment 1370b based on the BSS color.

As shown in FIG. 13a, the example PPDU 1300a that may be transmitted using 80 MHz numerology. The L-STF to EHT-SIG may be transmitted using legacy numerology and repeated on each 20 MHz channel/bandwidth subsegment, i.e., 20 MHz duplicate transmissions. Starting from the EHT-STF, the transmission may use a numerology defined for the 80 MHz channel/bandwidth segment. The second subchannel/subsegment 1370b may be assigned to one of multiple APs ("AP 2"). The AP 2 may apply zeros to (null) subcarriers other than those for second subchannel/subsegment 1370b. The contribution from the AP 2 may result in the EHT-STF, EHT-LTF, E-SIG and the following data part (not shown) being transmitted on the second subchannel/subsegment 1370b with 80 MHz numerology. Similarly, each of the remaining APs assigned one or more of the other subchannels/bandwidth subsegments 1370a, 1370c, 1370c may apply zeros to (null) subcarriers other than those corresponding to such subchannel(s). The contributions from the remaining APs may result in the EHT-STF, EHT-LTF, E-SIG and following data part (not shown) being transmitted on 20 MHz subchannels/bandwidth subsegments with 80 MHz numerology.

As shown in FIG. 13b, the PPDU 1300b that may be transmitted with 20 MHz numerology. The L-STF to E-SIG may be transmitted using legacy numerology. The L-STF to EHT-SIG may be replicated and transmitted on each 20 MHz channel/bandwidth subsegment, i.e., 20 MHz duplicate transmissions. The E-SIG field may be transmitted on an assigned 20 MHz channel, e.g., the second subchannel/subsegment 1370b as shown. Starting from the EHT-STF, the transmission may use a numerology defined for the 80 MHz channel. The second subchannel/subsegment 1370b may be assigned to one of multiple APs ("AP 2"). The AP2 may apply zeros to (null) subcarriers other than those for the second subchannel/subsegment 1370b. The contribution from the AP 2 may result in the EHT-STF, EHT-LTF and the following data part (not shown) being transmitted on the second subchannel/subsegment 1370b with 80 MHz numerology. Similarly, each of the remaining APs assigned one or more of the other subchannels/bandwidth subsegments 1370a, 1370c, 1370c may apply zeros to (null) subcarriers other than those corresponding to such subchannel(s)/bandwidth subsegment(s). The contributions from the remaining APs may result in the EHT-STF, EHT-LTF and the following data part (not shown) being transmitted on 20 MHz subchannels/bandwidth subsegments with 80 MHz numerology.

STAs receiving a PPDU shown in FIG. 10 may check all the SIG fields, including U-SIG, EHT-SIG and E-SIG for BSS color and resource allocation. The STAs may go to sleep mode if its associated BSS color may not be any BSS color carried in the SIG fields or its STA ID are not carried in any SIG fields.

A PPDU format having extra signaling (e.g., in E-SIG fields) to support subchannel based signaling for C-MAP transmissions may be provided. C-MAP transmission signaling may be carried in U-SIG and EHT-SIG fields, for example.

Figures 14, 15:
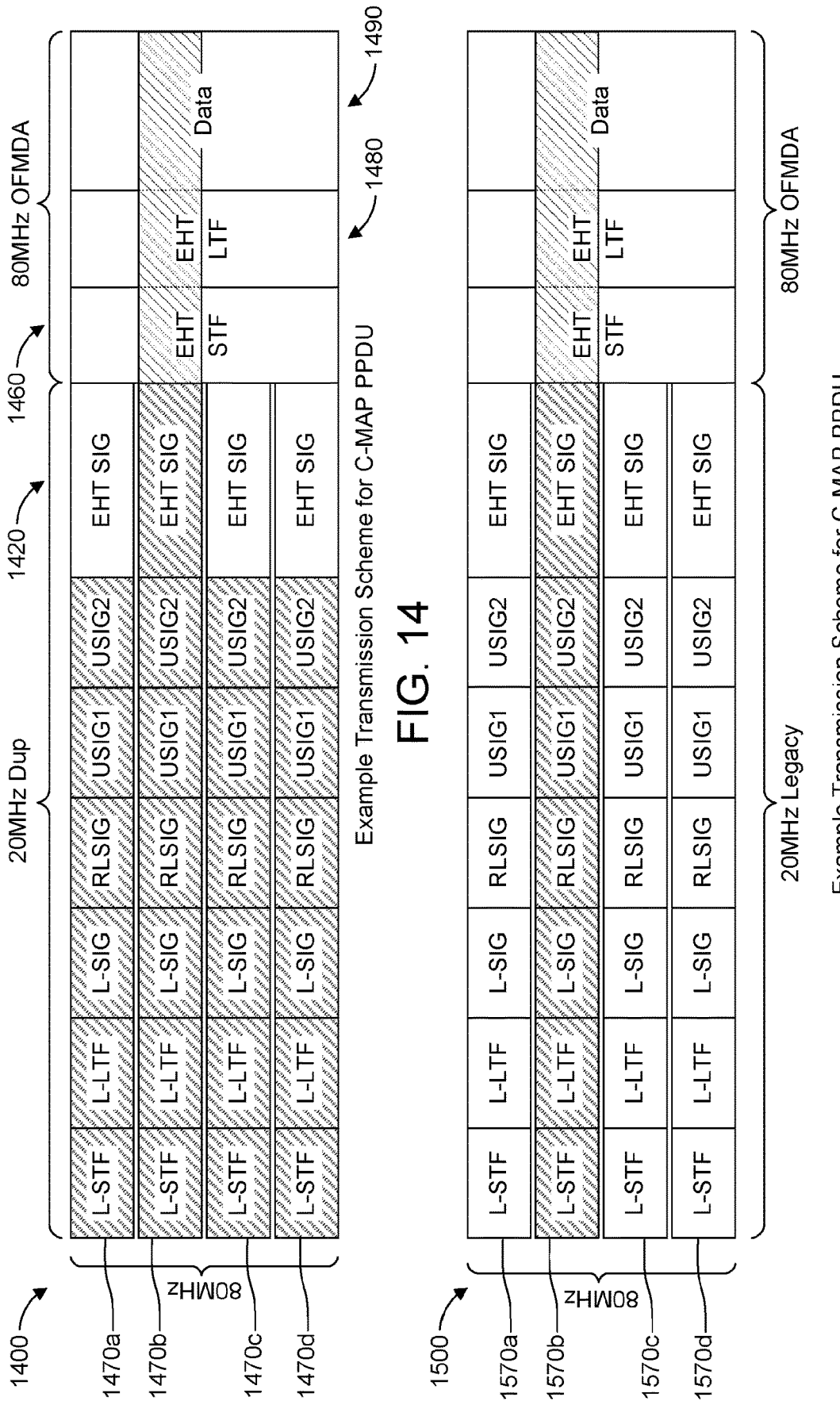
FIG. 14 illustrates an example MU PPDU that may be used to transmit C-MAP PPDUs.
FIG. 15 illustrates an example MU PPDU that may be used to transmit C-MAP DL PPDUs.

FIG. 14 illustrates an example MU PPDU 1400 that may be used to transmit C-MAP DL PPDUs. The L-STF field to U-SIG2 field are transmitted using 20 MHz duplicate transmissions. For example, the fields may be modulated to a 20 MHz subchannel 1470b and duplicated with or without rotation in the rest of 20 MHz subchannels/bandwidth subsegments 1470a, 1470c, 1470c. The EHT-SIG field 1420 may be modulated using 20 MHz numerology and transmitted on the 20 MHz subchannel/subsegment 1470b assigned to the BSS. The EHT-STF/LTF fields 1460, 1480 and data fields 1490 may be transmitted using 80 MHz numerology. The AP may transmit these fields on the assigned subchannel(s)/bandwidth subsegment(s), e.g., 20 MHz, with zeros applied to the rest of subcarriers.

FIG. 15 illustrates an example MU PPDU 1500 that may be used to transmit C-MAP DL PPDUs. The transmission of all the fields may be on assigned 20 MHz subchannels/bandwidth subsegments 1570a-d. The L-STF to EHT-SIG may be modulated using 20 MHz legacy numerology and the rest fields may be modulated using 80 MHz numerology with zeros being applied to (nulling) subcarriers on the other subchannels/bandwidth subsegments 1570. The STA associated with the AP may know which of the subchannels/bandwidth subsegments 1570a-d is/are assigned to the AP before the PPDU transmission.

The U-SIG field may be used to carry common information about the C-MAP transmissions. The U-SIG field may include one or more subfields (e.g., a combination of two or more subfields) that may indicate the transmission is a C-MAP transmission. The U-SIG field may include a BSS color subfield and a BW/puncturing pattern subfield. The BSS color subfield may indicate BSS color of a sharing AP. Alternatively, the BSS color subfield may indicate a virtual BSS color. The shared and sharing APs may negotiate the virtual BSS color for the C-MAP transmission. In another alternative, the BSS color subfield may indicate a BSS color value specifically reserved to indicate a C-MAP transmission. The BW/puncturing pattern subfield may indicate a total bandwidth acquired by the sharing AP for C-MAP (e.g., OFDMA) transmission. The total bandwidth indicated in the BW/puncturing pattern subfield may include bandwidth shared to other (shared) APs.

The EHT-SIG field may carry AP or BSS specific information, such as an RU allocation for that BSS.

As disclosed supra, a PPDU may include mandatory SIG fields (e.g., any of a U-SIG and an EHT-SIG) and E-SIG fields, and any of the mandatory SIG fields (e.g., any of a U-SIG and an EHT-SIG) may include one or more E-SIG present (sub)fields. Although referred to as "(sub)fields", the E-SIG present (sub)fields need not be separate (sub)fields of the PPDU. Each E-SIG present sub(field) may be any information (bits) of the PPDU that may indicate that (or whether) the PPDU or some (sub)field thereof includes E-SIG (e.g., one or more E-SIG fields).

In various embodiments, one or more E-SIG fields may be included in one or more of the mandatory SIG fields. The E-SIG fields, for example, may be included as subfields of the mandatory SIG fields. As disclosed supra, the E-SIG field, in various embodiments, may have different types/ formats/sub-fields/sizes (or number of bits), e.g., to support different transmission modes, transmission order and/or different features. Examples of such different features may include optional features, such as one or more features of the phase-two release of IEEE 802.11be.

In various embodiments, the E-SIG fields may include various user-specific E-SIG information and/or common E-SIG information. The user-specific E-SIG information may be for, for use by, and/or associated with, one or more specific STAs/users. The specific STAs/users may be, e.g., a single STA/user or one or more specific groups of one or more of STAs/users. The common E-SIG information may be for, for use by, all STAs/users and/or not solely for, for use by, and/or not solely associated with a specific STA/user and/or a specific group of one or more of STAs/users.

The E-SIG fields may include separate fields and/or subfields for the various user-specific E-SIG information and common E-SIG information. For example, the E-SIG fields may include user specific fields and/or subfields (collectively "user-specific E-SIG (sub)fields") and common fields and/or subfields (collectively "common E-SIG (sub) fields"). The user-specific E-SIG (sub)fields may include (e.g., be populated with, carry, etc.) user-specific E-SIG information. The common E-SIG (sub)fields may include (e.g., be populated with, carry, etc.) the common E-SIG information. The common and/or user specific E-SIG fields may be separately encoded and protected by its own CRC, thus may carry CRC bits and tail bits. In various embodiments, some or all of the various user-specific E-SIG information and common E-SIG information may be multiplexed, piggybacked or otherwise combined and/or not carried in separate E-SIG fields and/or subfields.

Figure 16:
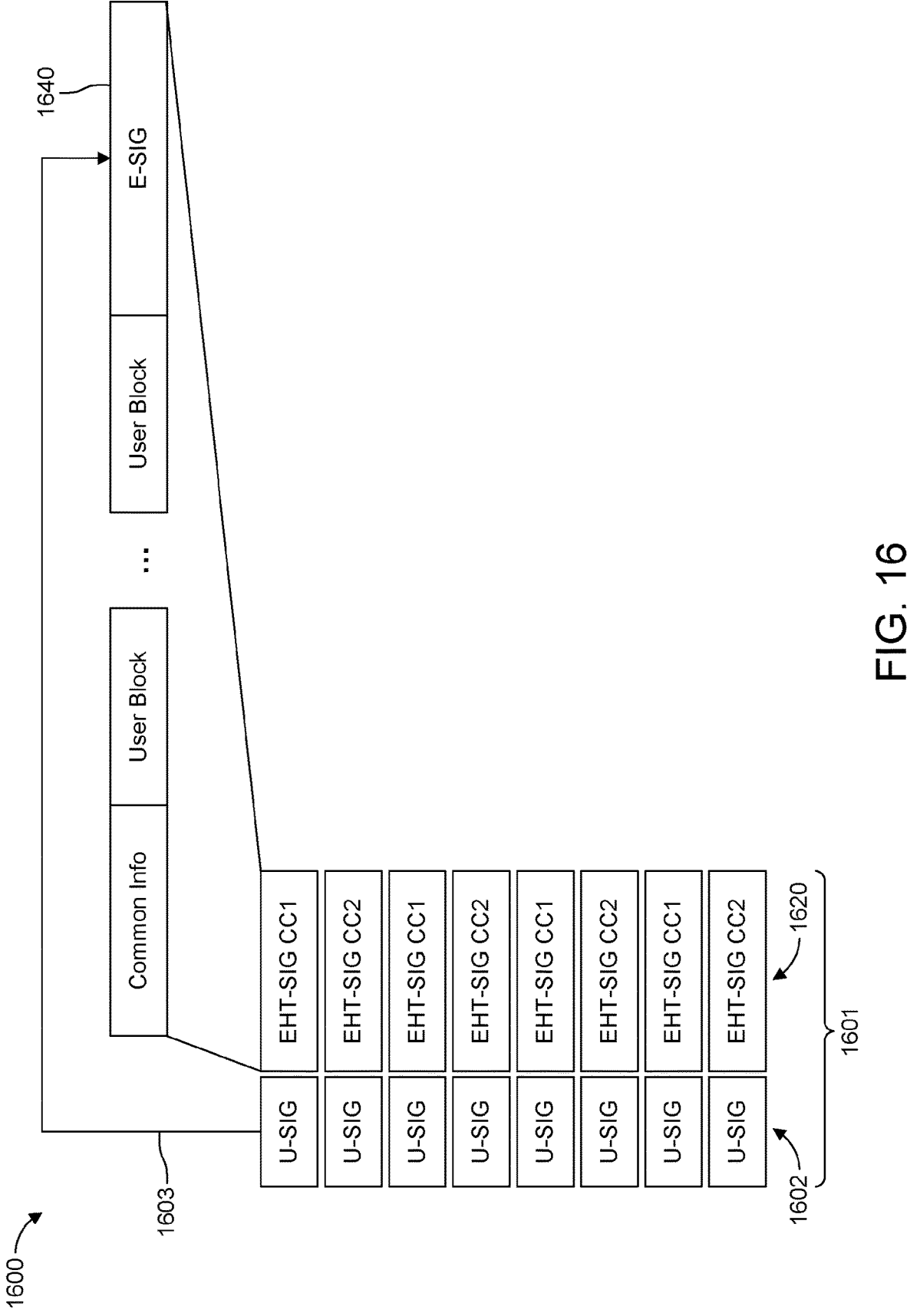
FIG. 16 illustrates example mandatory SIG and E-SIG fields of a PPDU, where the E-SIG field carries signaling to support various features.

FIG. 16 illustrates example mandatory SIG and E-SIG fields 1601, 1640 of a PPDU 1600, where the mandatory SIG and E-SIG fields 1601, 1640 carry signaling to support various features. As shown, the mandatory SIG fields 1601 may include U-SIG and EHT-SIG fields 1602, 1620.

The U-SIG field 1602 (or EHT-SIG field 1620) may include an E-SIG present (sub)field 1603. The E-SIG present (sub)field 1603 may indicate that the EHT-SIG field 1620 includes E-SIG (e.g., an E-SIG (sub)field 1640). The E-SIG present (sub)field 1603 may be, for example, any of a reserved bit, version indication and PPDU type subfield. Alternatively, the E-SIG present (sub)field 1603 may be one or more bits in one or more fields (e.g., common fields) of EHT-SIG 1620. In various embodiments, one or more bits in the U-SIG and/or EHT-SIG field(s) 1602, 1620 may be used to indicate which feature or features may be included in the E-SIG fields 1640. The bits in the U-SIG and/or EHT-SIG field(s) 1602, 1620 may be, for example, a bitmap. Various bits of the bitmap may be configured and/or used to identify the feature or features may be included in the E-SIG fields 1640. For example, bit 1 of the bitmap may be used to identify (indicate) a MAP transmission, bit 2 of the bitmap may be used to identify (indicate) HARQ, and so on. Each bit in the bitmap may be set to a specific value (e.g., to "1") to indicate that the corresponding E-SIG field 1640 may carry information for the corresponding feature. The number of bits set to the specific values (e.g., the number of bits set to "1") in the bitmap may be used to indicate the number of E-SIG fields 1640 carried in the EHT-SIG field 1620.

The EHT-SIG field 1620 may contain one or more EHT-SIG content channels. Each content channel may carry leftover from the U-SIG field 1602, the common info field, zero or more user block fields (also referred to as user specific fields), and zero or more E-SIG fields 1640. Each E-SIG field 1640 may carry the information for one (or more) features, e.g., any of an optional feature, a feature of the phase-one release of IEEE 802.11be, and a feature of the phase-two release of IEEE 802.11be. For example, an E-SIG may carry extension information, such as color extension, TXOP duration extension, HARQ related information, MAP related information etc. In various embodiments, the same E-SIG information may be repeatedly carried in every content channel. In various embodiments, the E-SIG information may be split to different content channels. For example, if two content channels are carried in the EHT-SIG, the first part of the E-SIG information (field(s)) may be carried in content channel 1 and the second part of the E-SIG information (field(s)) may be carried in content channel 2.

In various embodiments, the E-SIG fields may be carried (transmitted/received) after the user block fields.

A recipient STA may use various information to determine a location of the E-SIG fields. The STA may, for example, determine the location of the E-SIG fields based on information in one or more U-SIG fields. A U-SIG field may indicate a number of symbols occupied by the EHT-SIG fields and MCS used for transmitting the EHT-SIG fields. The STA may determine a starting point and/or an ending point of the EHT-SIG fields based on the number of symbols occupied by the EHT-SIG fields and MCS used for transmitting the EHT-SIG fields. The STA may use the starting point and/or the ending point of the EHT-SIG fields (which include the E-SIG fields) along with information and/or one or more rules to locate the E-SIG fields within the EHT-SIG fields and/or to segregate/obtain the E-SIG fields from the EHT-SIG fields.

The STA may check all the EHT-SIG content channels it decodes. For each EHT-SIG content channel, the STA may check the common info field in EHT-SIG, which may indicate (e.g., explicitly or implicitly indicate) a number of user block fields carried in the EHT-SIG content channel. Each user block field may have fixed size. The STA may determine the end of last user block field based on the number of user block fields carried in the EHT-SIG content channel and the sizes of the user block fields. The STA may treat the bits after the last user block field as bits of the E-SIG fields. The STA which detected the presence of the E-SIG fields may continue decoding the fields from the end of user block fields to the end of the EHT-SIG field.

Figures 17, 18:
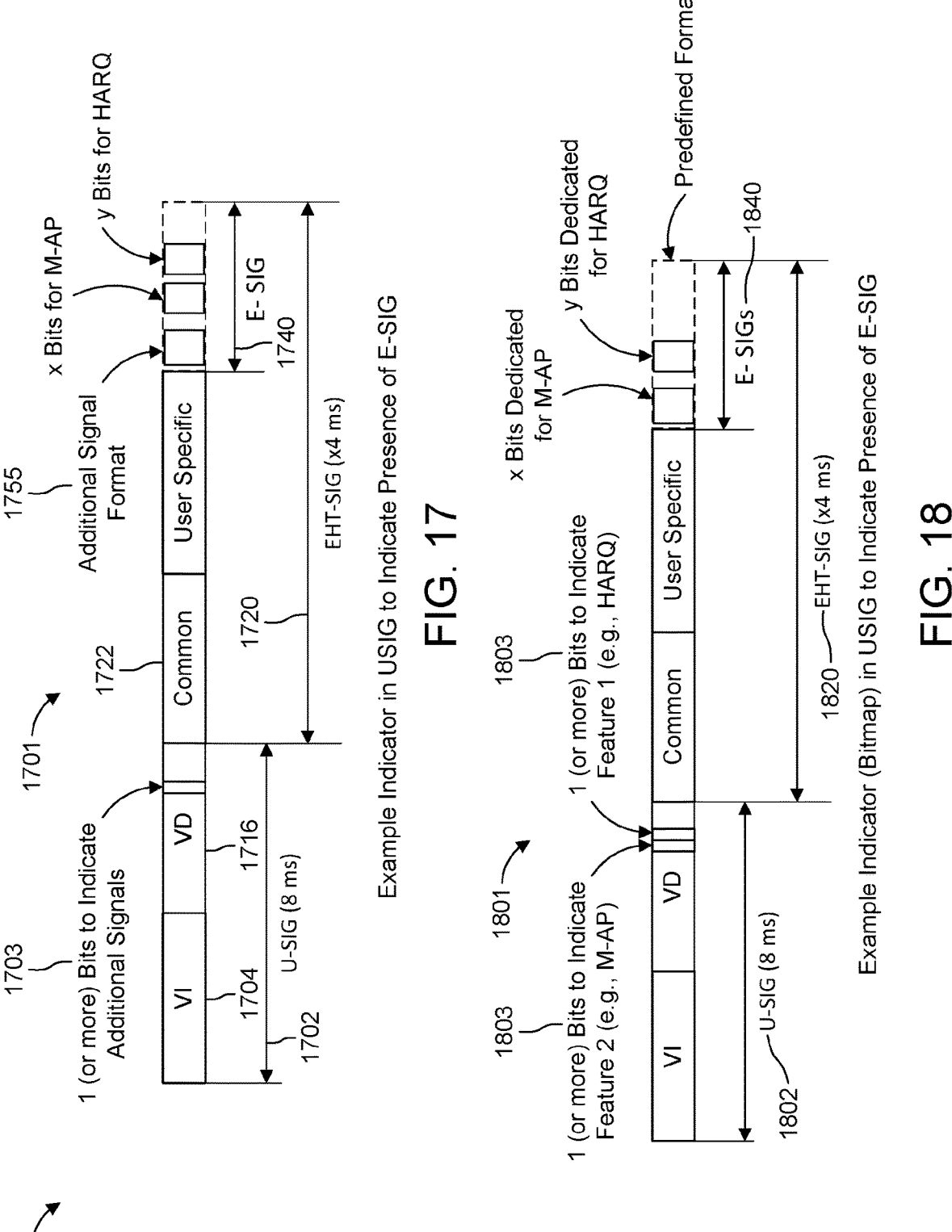
FIG. 17 illustrates example mandatory SIG and E-SIG fields of a PPDU, where the E-SIG field carries signaling to support various features.
FIG. 18 illustrates example mandatory SIG and E-SIG fields of a PPDU, where the E-SIG field carries signaling to support various features.

FIG. 17 illustrates example mandatory SIG and E-SIG fields 1701, 1740 of a PPDU 1700, where the mandatory SIG and E-SIG fields 1701, 1740 carry signaling to support various features. As shown, the mandatory SIG fields 1701 may include U-SIG and EHT-SIG fields 1702, 1720. The E-SIG present (sub)field 1703 of the U-SIG/EHT-SIG may be as small as one bit. For example, the U-SIG field 1702 may include version independent (VI) fields 1704 and version dependent (VD) fields 1716, and the VD field 1716 (or the VI field 1704) part may include the (e.g., one-bit) E-SIG present (sub)field 1703. Alternatively, and/or additionally, the common field 1722 of EHT-SIG field 1720 may include the (e.g., one-bit) E-SIG present (sub)field 1703.

An E-SIG field with a given E-SIG type may have fixed size. The STA may determine the end of the E-SIG field based on the E-SIG type and the fixed size thereof. In various embodiments, the first k bits (or k bits in a fixed location) in each E-SIG field may indicate the E-SIG type. The STA may check the first k bits (or k bits in a fixed location) in E-SIG field and may determine the E-SIG type. Based on the E-SIG type, the STA may determine the format and size of the E-SIG. The STA may continue checking the rest of the bits to locate more E-SIG fields if needed. In various embodiments (e.g., as shown in FIG. 17), an additional signal format field 1755 may be added before the E-SIGs. The additional signal format field 1755 may indicate the type of E-SIGs that follow (e.g., in order).

FIG. 18 illustrates example mandatory SIG and E-SIG fields 1801, 1840 of a PPDU 1800, where the mandatory SIG and E-SIG fields 1801, 1840 carry signaling to support various features. As shown, the mandatory SIG fields 1801 may include U-SIG and EHT-SIG fields 1802, 1820. The E-SIG present (sub)field 1803 of the U-SIG/EHT-SIG may be a bitmap. The number and order of the E-SIG fields 1840 carried in the EHT-SIG may be same as the number and order of bits in the bitmap (e.g., as shown). The STA may determine the number of E-SIG fields 1840 carried in the EHT-SIG based on the bitmap.

Each E-SIG field 1840 with a given E-SIG type may have a fixed size. The STA may locate the start of each E-SIG field 1840 based on (e.g., using the E-SIG field size(s) corresponding to the E-SIG type(s)). The STA may use other information as well to locate the start of each E-SIG field 1840. The STA, for example, may use the number the number of user block fields carried in the EHT-SIG content channel and the sizes of the user block field.

In various embodiments, a known bit sequence may be inserted at the beginning of each E-SIG field. The STA may detect the known sequence and determine the start of each E-SIG field.

Figure 19:
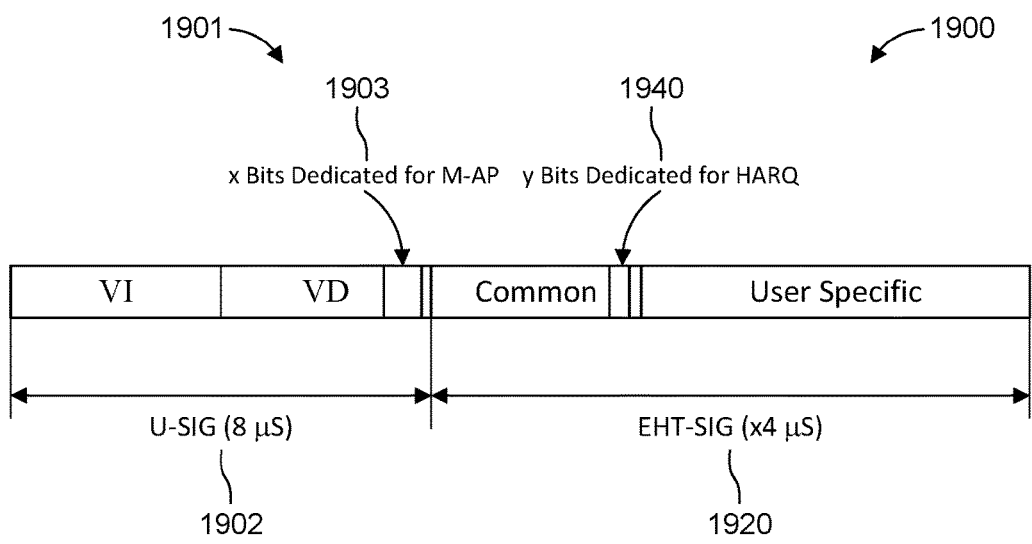
FIG. 19 illustrates example mandatory SIG and E-SIG fields of a PPDU, where the E-SIG field carries signaling to support various features.

FIG. 19 illustrates example mandatory SIG and E-SIG fields 1901, 1940 of a PPDU 1900, where the mandatory SIG and E-SIG fields 1901, 1940 carry signaling to support various features. As shown, the mandatory SIG fields 1901 may include U-SIG and EHT-SIG fields 1902, 1920 and the E-SIG fields 1940 are disposed in a common (sub)field 1922 of the EHT-SIG field 1920. The E-SIG present (sub)field 1903 in the U-SIG field 1902 may be 1 bit or x bits and may indicate presence of the E-SIG field(s) 1940 and/or specific E-SIG field(s) 1940. In various embodiments, the common field in E-SIG may have variable size, e.g., depending on the type(s) of E-SIG field(s).

Figure 20:
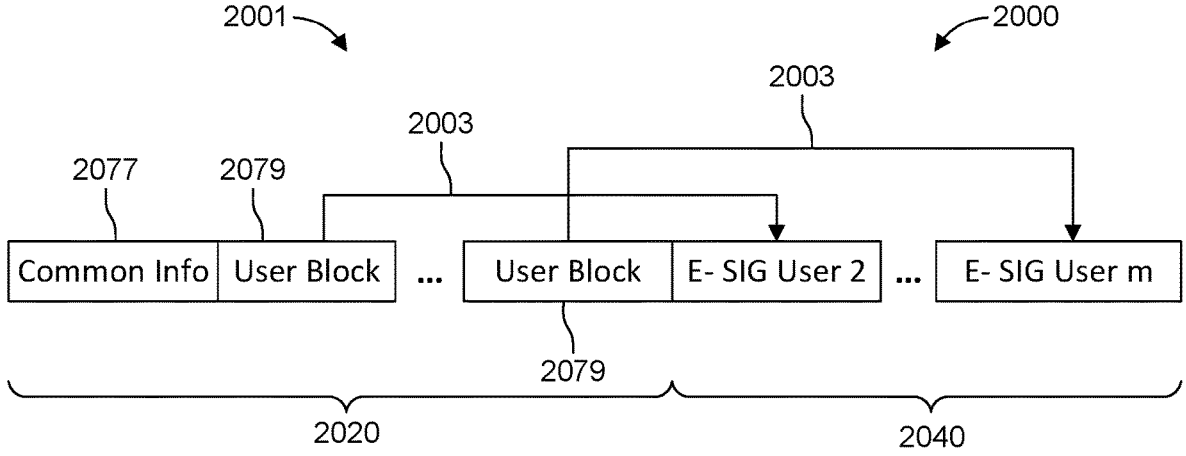
FIG. 20 illustrates example mandatory SIG and E-SIG fields of a PPDU, where the E-SIG field carries signaling to support various features.

FIG. 20 illustrates example mandatory SIG and E-SIG fields 2001, 2040 of a PPDU 2000, where the mandatory SIG and E-SIG fields 2001, 2040 carry signaling to support various features. As shown, the mandatory SIG fields 2001 may include EHT-SIG fields 2020. The EHT-SIG field 2020 may carry left over fields from U-SIG (not shown), a common info field 2077, zero or more user block fields 2079, and zero or more E-SIG fields 2040. Each user block field 2079 may carry information for k users, where k>1. Each user block field 2079 may include an E-SIG present (sub)field 2003. The E-SIG present (sub)field 2003 of any user block field include one or more bits and may be used to indicate the presence of user-specific E-SIG information/field(s) 2040. The user-specific E-SIG information/fields 2040 may be appended (transmitted/received) following corresponding user block fields and/or following all user block fields 2079 (e.g., as shown in FIG. 20). If appended (transmitted/received) following all user block fields 2079, then the order of E-SIG fields 2040 may be the same as the order of the user block fields 2079.

A STA may decode all user block fields 2079 until it may find its STA ID in a user block field. Then the STA may locate its corresponding E-SIG field 2040 based on the STA ID.

In various embodiments, one or more E-SIG fields may be added (transmitted/received) following (e.g., immediately following) a U-SIG field. Such E-SIG fields may be referred to as U-SIG extension fields and may carry information for one (or more) features, e.g., any of an optional feature, a feature of the phase-one release of IEEE 802.11be, and a feature of the phase-two release of IEEE 802.11be.

In various embodiments, the U-SIG field may include an E-SIG present (sub)field. The E-SIG present (sub)field included in the U-SIG field may be as small as one bit and may be used to indicate the presence of the U-SIG extension information/field(s). A U-SIG extension field may have fixed size, e.g., one or two OFDM symbols. Alternatively, a U-SIG extension field may have variable size. A field in fixed location of U-SIG extension field may be used to indicate the size of U-SIG extension field.

In various embodiments, one or more bits in the U-SIG field may explicitly or implicitly indicate the size of U-SIG extension field. A value of 0 may indicate the U-SIG Extension field may not present.

In various embodiments, the U-SIG field may carry any of a release number, a sub-generation number, a sub-version number. Any of the release number, sub-generation number, sub-version number may indicate a release of each version, e.g., release II of IEEE 802.11be.

As disclosed supra and infra, a PPDU may include E-SIG (e.g., one or more E-SIG fields), whether in a subfield of, or independent from, mandatory SIG fields, to support different transmission modes, transmission order and/or different features (e.g., without necessitating a dedicated PPDU format therefor). In accordance with such disclosures, the E-SIG, in various embodiments, may be used for transmissions having physical layer signaling following (in time) a preamble and/or otherwise not part of the preamble ("non-preamble physical layer signaling"). A PPDU, for example, may include E-SIG for any of one or more midambles, one or more post-preamble additional reference signals and other non-preamble physical layer signaling. The E-SIG may include information corresponding to the non-preamble physical layer signaling, e.g., information for supporting (identifying, use with, etc.) the non-preamble physical layer signaling. A single or a combination of the E-SIG fields may indicate that (or whether) the PPDU or some (sub)field thereof includes the non-preamble physical layer signaling. For example, if an E-SIG type indicates a doppler E-SIG field and/or a midamble present field is set, such combination of E-SIG fields may indicate that (or whether) the PPDU or some (sub)field thereof includes the non-preamble physical layer signaling.

As an example, a PPDU may include (e.g., adapted by the PHY layer to include) E-SIG (e.g., one or more E-SIG fields) for one or more midambles and/or other non-preamble additional reference signals in connection with a doppler condition (such as a high doppler condition, e.g., in connection with transmissions exchanged while moving (e.g., in a vehicle) at a high rate of speed). The E-SIG may include one or more bits, e.g., in one or more E-SIG type fields and/or in one or more E-SIG fields, that may indicate the type(s) of E-SIG(s) carried in the PPDU. If one or more of the E-SIG type fields indicate a doppler E-SIG field and/or a midamble present field is set, then the corresponding E-SIG field(s) may provide information corresponding to the non-preamble physical layer signaling (e.g., information for supporting (identifying, use with, etc.) the non-preamble physical layer signaling). The E-SIG for a doppler E-SIG type may include information, such as doppler parameters, whether midamble is present, midamble periodicity etc. The E-SIG type may indicate other types, MAP E-SIG, HARQ E-SIG for example. For a MAP E-SIG type, the E-SIG may include information in accordance with the disclosures herein supra and infra. For a HARQ E-SIG type, the E-SIG may include information in accordance with the disclosures herein supra and infra.

In accordance with the disclosures herein supra and infra, the E-SIG may be carried in various bits of the PPDU. For example, the information corresponding to the non-preamble physical layer signaling may be transmitted in one or more the E-SIG fields, where one or more of the E-SIG field and/or E-SIG subfields may be part of (transmitted during) the preamble. As another example, information corresponding to a first of a plurality of non-preamble physical layer signalings (e.g., a first midamble) may be transmitted, at least in part, in one or more E-SIG fields and/or one or more E-SIG subfields of the preamble; and information corresponding to a second of the plurality of non-preamble physical layer signalings (e.g., a second or a subsequent midamble) may be transmitted, at least in part, in one or more E-SIG fields and/or one or more E-SIG subfields of the first non-preamble physical layer signaling, and so on (for one or more of the other non-preamble physical layer signalings). Alternatively, information corresponding to the second and one or more of the other non-preamble physical layer signalings (e.g., a second and one or more subsequent midambles) may be transmitted, at least in part, in one or more E-SIG fields and/or one or more E-SIG subfields of the first (or other) non-preamble physical layer signaling.

IEEE 802.11be defines a unified preamble format to use for PPDUs (other than trigger based PPDUs) that may be used for any of SU transmissions, OFDMA transmissions and MU-MIMO transmissions. Some transmission schemes might not apply to all types of transmissions. For example, transmission schemes that may use any of midamble, space-time block coding (STBC), frequency hopping, massive MIMO, etc., may be applied to SU transmissions, but not OFDMA transmissions and/or MU-MIMO transmissions. The transmission schemes that are not applicable to all types of transmissions may be considered as optional features when using the unified preamble format. Any of the optional transmission schemes may be applied to a PPDU using E-SIG in accordance with the disclosures herein supra and infra, e.g., as E-SIG for non-preamble physical layer signaling. For example, a PPDU may include the non-preamble physical layer signaling (e.g., an optional transmission scheme) and E-SIG, e.g., in one or more E-SIG type fields and/or one or more E-SIG (sub)fields, that (i) may indicate that (or whether) the PPDU includes E-SIG of a particular type, and/or (ii) may provide information corresponding to the non-preamble physical layer signaling (e.g., information for supporting (identifying, use with, etc.) the non-preamble physical layer signaling). The information corresponding to the non-preamble physical layer signaling may indicate the E-SIG type, transmission type, etc. The transmission type may be, e.g., a SU transmission, an OFDMA transmission, a MU transmission, etc.

The transmitter may carry out ordering of various user block fields in an EHT-SIG content channel based on RU allocations indicated thereby. For example, the transmitter may order the various user block fields based on the channel, subchannel and/or segment in which frequency resources are allocated. The user block fields may be interchangeably referred to as user fields.

Figure 21:
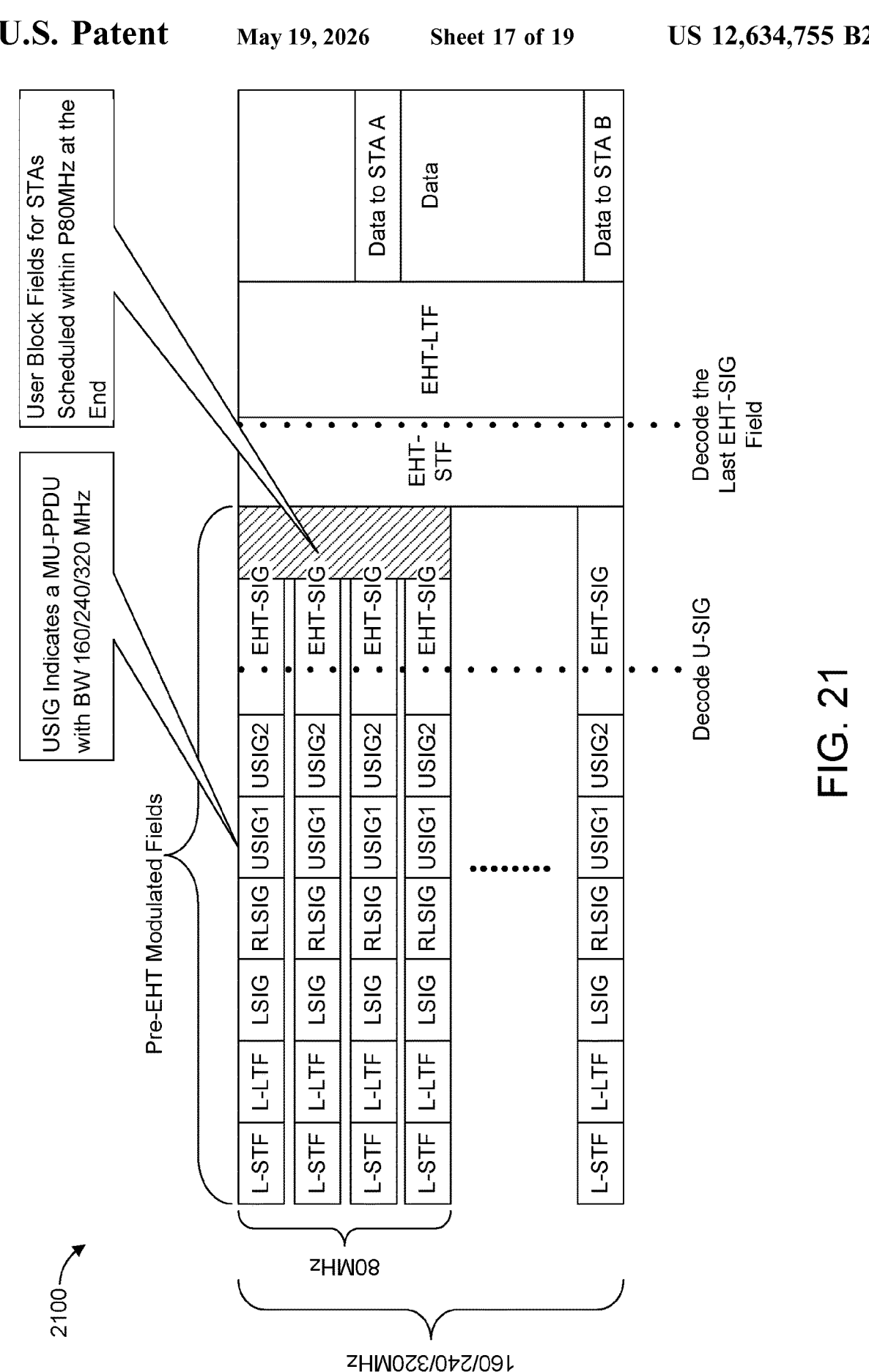
FIG. 21 illustrates an example PPDU in which resources for STAs scheduled in a first bandwidth segment are allocated towards a trailing end of an EHT-SIG content channel.

FIG. 21 illustrates an example PPDU 2100 having a plurality of user block fields. The user block fields may include one or more primary user block fields and one or more secondary user block fields. A primary user block field may include one or more RUs of a primary segment and/or subchannel allocated to one or more STAs. A secondary user block field may include one or more RUs of a secondary segment and/or subchannel allocated to one or more STAs.

The primary user block fields may be generated and transmitted towards a trailing end of an EHT-SIG content channel and/or after some or all secondary user block fields. For example, some or all secondary user block fields that may include and/or indicate RU allocations not within (outside) a primary bandwidth (e.g., a primary X MHz bandwidth, where X may be 160, 80 or 40) may be located (generated and/or transmitted) before some or all primary user block fields that may include and/or indicate one or more RU allocations within the primary bandwidth and/or towards the trailing end of the EHT-SIG content channel. A motivation for ordering the primary and secondary user block fields is that the STAs scheduled outside the primary bandwidth, primary bandwidth segment, primary subchannel, etc. may have to switch/expand their receiver bandwidths for AGC, unlike STAs scheduled within the primary bandwidth, primary bandwidth segment, primary subchannel, etc. and/or STAs not scheduled by the PPDU. The ordering primary and second user block fields and/or the durations of the primary user block fields may enable the STAs scheduled in one or more of the secondary bandwidths, secondary bandwidth segments and/or secondary subchannels, etc. to adjust their receive bandwidths for performing AGC while the STAs scheduled within the primary bandwidth, primary bandwidth segment, primary subchannel, etc. (and the STAs not scheduled) may continue to receive on the current receive bandwidth for the remainder of the EHT-SIG field and/or for the EHT-STF.

For example, in FIG. 21, a first STA ("STA A") may be allocated resources within the primary 80 MHz bandwidth (e.g., a primary bandwidth segment) and a second STA ("STA B") may be allocated resources in a bandwidth outside the primary 80 MHz bandwidth/segment (e.g., a secondary bandwidth segment). The transmitter may arrange the EHT-SIG content channel such that a primary user block field including and/or indicating an RU allocation for the STA A may occur (be generated and/or transmitted) after a secondary user block field including and/or indicating an RU allocation for STA B and/or all other secondary user block fields. The STA B may adjust its receiver to the bandwidth that includes the RU allocations for receiving EHT-STF. The STA B, for example, may adjust its receiver during a time period after decoding the corresponding secondary user block field.

In various embodiments, any of the U-SIG and EHT-SIG fields may include information indicating when (during transmission of the EHT-SIG field) scheduling any STA outside the primary bandwidth segment will be cutoff. The information may indicate a time of day or other specific time. Alternatively, the information may indicate an amount of time ("a time period T") to use to determine the cutoff. The cutoff may be determined by applying the time period T as an offset starting from the beginning of the transmission the EHT-SIG field. Alternatively, the cutoff may be determined by applying the time period T as an offset starting from a time at which the information is received, decoded, etc. As another alternative, the cutoff may be determined by applying the time period T as an offset starting from the beginning of the transmission the U-SIG field or other earlier transmitted field.

In various embodiments, if a STA has not been scheduled outside the primary bandwidth segment by the cutoff, the STA may assume it will not thereafter receive a user block field including and/or indicating an RU that schedules the STA outside the primary bandwidth segment.

The above embodiments may be applied to a bandwidth region/segment other than the primary bandwidth segment. A STA may be assigned to receive on a bandwidth region/segment (e.g., only on the bandwidth region/segment). For example, the bandwidth region/segment may be a secondary 80 MHz bandwidth region/segment, and an 80 MHz-only capable EHT STA may be assigned to monitor/receive on the secondary 80 MHz bandwidth region/segment (e.g., only on the secondary 80 MHz bandwidth region/segment). The user block field including and/or indicating an RU allocation for the STA may be located (generated and/or transmitted) after all other user block fields in the EHT-SIG content channel (or after all user block fields including and/or indicating RU allocations for STAs scheduled outside the bandwidth region/segment).

In various embodiments, a STA may be assigned to receive scheduling information on the bandwidth region/segment, and to receive data (at least partially) outside of the bandwidth region/segment. For example, the bandwidth region/segment may be a secondary 80 MHz bandwidth region/segment and an 80 MHz-only capable EHT STA may be assigned to monitor for, and/or receive, only scheduling information on the secondary 80 MHz bandwidth region/segment. In a case where the STA is to be scheduled outside of the secondary 80 MHz bandwidth region/segment, the user block field including and/or indicating the RU allocation for the STA may be located (generated and/or transmitted) before all other user block fields (or before all user block fields including and/or indicating RU allocations for STAs scheduled within the bandwidth region/segment). The STA need not adjust it receive bandwidth between receiving scheduling information and receiving the allocated RU(s). Alternatively, for such STA, the corresponding user block field may be generated and/or transmitted before cutoff, e.g., during a time period T starting from the beginning of the EHT-SIG. As above, the STA may assume it will not receive a user block field including and/or indicating an RU that schedules the STA outside the bandwidth region/segment after the cutoff.

In various embodiments, a STA that receives a user block field (which may be a user block field for another receiving STA) in any EHT-SIG content channel that assigns a RU that is within its bandwidth region/segment for monitoring scheduling information, may assume it will not receive a user field that assigns RU(s) outside of the bandwidth region/segment to it.

In various embodiments, an indicator may be included in a user block field. The indicator may signal to a STA that receives a user block field including the indicator (which may be a user block field for another receiving STA) in any EHT-SIG content channel, it may assume it will not be assigned an RU for monitoring scheduling information outside of the bandwidth region/segment (e.g., not receive a user block field indicating an assignment for RU for monitoring scheduling information outside of the bandwidth region/segment).

In various embodiments, a padding field may be included in the EHT-SIG content channel for allowing a STA that may be assigned one or more RU(s) outside of the bandwidth region/segment sufficient time to adjust its receive frequency/bandwidth for monitoring for scheduling information.

Various solutions for synchronizing the concurrent transmissions of a shared TXOP are provided. At least some of the various solutions include performing preamble alignment. For simplicity of exposition in the disclosure that follows, the packet formats for the concurrent transmissions within a shared TXOP are assumed those disclosed herein. One of ordinary skill in the art will recognize that the concurrent transmissions within a shared TXOP may use other packet formats as well.

In various embodiments, the concurrent transmissions of a shared TXOP may occur over multiple subchannels/segments and may be between (i) a single AP and multiple groups of STAs (e.g., different/distinct subchannel(s)/segment(s) per group of STAs), or (ii) multiple APs and multiple STAs (e.g., different/distinct subchannel(s)/segment(s) per AP). The concurrent transmissions of each of the multiple APs may be between the AP and one or more STAs. Alternatively, the concurrent transmissions of each of the multiple APs may be between the AP and multiple groups of STAs (e.g., different/distinct subchannel(s)/segment(s) per AP per group of STAs). All of the concurrent transmissions need not have same the packet format (e.g., the same numerology, PPDU format, PPDU fields, etc.). For example, the concurrent transmissions occurring over two or more (or each) different/distinct subchannel(s)/segment(s) may have different packet formats. By way of example, an EHT PPDU and an HE PPDU may be concurrently transmitted during a TXOP over different/distinct sets of one or more subchannels/segments. As another example, two EHT PPDUs having different durations may be concurrently transmitted during a TXOP over different/distinct sets of one or more subchannels/segments.

To enable synchronization, preamble alignment may be carried out using any field thereof having a variable size. The EHT-SIG field and/or the E-SIG field may be used, for example.

In various embodiments, a PPDU may have an EHT-SIG field with a fixed length that is the same length of a legacy PPDU with an E-SIG field with a variable size. Examples of the E-SIG field and PPDU with an E-SIG field are disclosed herein above. Various details of the U-SIG, EHT-SIG and E-SIG fields, which may be redundant and/or in addition to those detailed above, are as follows:

A U-SIG field may carry any of the following: a PPDU type field, an EHT-SIG MCS field and a number of symbols for EHT-SIG field. The PPDU type may be used to indicate the presence of a E-SIG field. Alternatively, a new field may be used to indicate the presence of E-SIG field. The EHT-SIG MCS, in various embodiments, may be used to indicate the MCS for both EHT-SIG and E-SIG. The EHT-SIG and E-SIG may use the same MCS, for example. In various embodiments, the EHT-SIG may have a fixed MCS in some PPDU types. The EHT-SIG MCS field may be used to carry MCS for a E-SIG field. For example, when a PPDU type indicates a presence of an E-SIG field and the PPDU may be a shared PPDU among multiple AP and/or STAs, the EHT-SIG field may be modulated with a predetermined MCS, and the EHT-SIG MCS field may be interpreted as E-SIG MCS field. In various embodiments, the EHT-SIG may have a fixed size/length in some PPDU types. The number of symbols for EHT-SIG field may be used to carry a number of symbols for a E-SIG field. For example, when a PPDU type indicates a presence of E-SIG field and the PPDU may be a shared PPDU among multiple AP and/or STAs, the number of symbols for EHT-SIG field may have a predefined/predetermined size, and the number of symbols for EHT-SIG field may be interpreted as number of symbols for an E-SIG field.

In a PPDU type that may support E-SIG and C-OFDMA transmission, an EHT-SIG field carried by one AP may be different from that carried by another AP. If, for example, a first AP ("AP1") uses subchannels/bandwidth (sub)segments 1 and 2 and a second AP ("AP2") uses subchannels/bandwidth (sub)segments 3 and 4, then the EHT-SIG for the AP1 may be different than EHT-SIG for the AP2. In this example, each of the subchannels/bandwidth (sub)segments 1-4 may have 20 MHz granularity. If an AP is assigned to a subchannel/(sub)segment/(sub)segment with bandwidth equal or more than 80 MHz, repetition of content channel may be allowed. The content channel may include a common field and user specific field.

E-SIG size and/or padding related information and MCS may be signaled in EHT-SIG. The padding related information may include a number of padded bits before or after encoding, an E-SIG information bit length, a number of OFDM symbols for E-SIG, etc.

EHT-SIG may include one or more RU allocation fields and user specific information fields. The number of RU allocation fields and user specific information fields may be limited by the size of EHT-SIG field. One or more RU allocation fields and user specific information fields may be carried in a E-SIG field. An E-SIG may carry leftover from a EHT-SIG.

In various embodiments, an EHT-SIG field of any EHT PPDU may be padded to align the EHT PPDU with other concurrently transmitted PPDUs, e.g., at the beginning boundaries of the EHT-STF of the EHT PPDU and short training fields of the other PPDUs. The padding may be pre-coding padding or post-coding padding. Padding related information, such as EHT-SIG information bit length, number of padded bits and/or EHT-SIG length may be signaled. The padding related information may be conveyed using a U-SIG field. Alternatively, the padding related information may be conveyed using one or more frames exchanged among APs and/or APs and STAs prior to transmission of the PPDU. As another alternative, at least a portion of the padding related information may be conveyed in a U-SIG field and at least a portion of the padding related information may be conveyed using one or more frames exchanged between APs or APs and STAs prior to transmission of the PPDU. The frames exchanged among APs and/or APs and STAs may include those used for setting up the transmission.

In various embodiments, circular padding may be used in either pre-coding padding or post-coding padding. Assuming the bits before padding are $c_1, c_2, \ldots, c_M$, where M is the length of the bits before padding. N extra bits may be padded to the sequence so that the total number of bits is M+N. The sequence after circular padding may be $c_1, c_2, \ldots, c_M, c_1, c_2, \ldots, c_N$ if N≤M. If N>M, The sequence after circular padding may be $c_1, c_2, \ldots, c_M, c_1, c_2, \ldots, c_M, \ldots, c_1, c_2, \ldots, c_{mod(N,M)}$.

In various embodiments, when multi segment aggregated transmission is utilized, an AP may transmit more than one type of PPDU concurrently in a frequency domain. Legacy PPDUs, e.g., HE PPDUs, may be transmitted together with EHT PPDUs and/or PPDUs having other packet formats. Preamble padding should not be used in legacy PPDUs because legacy devices may not understand the meaning of the padded bits and/or be able to determine padding duration. For each legacy PPDU, the AP may calculate variable sized fields thereof, e.g., the duration of a HE-SIG-B field of an HE PPDU, first and then plan the scheduling of the EHT PPDUs. The AP may limit the number of scheduled STAs for EHT PPDU and/or PPDUs having other packet formats so that EHT-SIG field(s) and/or the SIG field(s) of the PPDUs having other packet formats may not be larger than the HE-SIG-B field. In this way, padding may be applied to EHT-SIG field. Padding may be applied in addition to or in lieu of the other preamble alignment methods disclosed herein.

In various embodiments, a combination of using E-SIG field and padding bits for EHT-SIG fields may be used. For example, if transmission of 802.11ax PPDU and 802.11be PPDU are concurrent using different subchannel(s), then the 802.11ax PPDU may carry HE-SIG-B field.

In various embodiments, when EHT-SIG fields are not synchronized and/or EHT-SIG fields and HE SIG B fields are not synchronized, extended STF sequences (fields) may be added prior to (e.g., immediately preceding) an EHT-STF or an HE STF so that the corresponding PPDUs are synchronized and/or aligned starting from the beginnings (or ends) of the EHT STF fields and/or the EHT-SIG and HE SIG B fields. The duration of an extended EHT-STF may be an integer or fractional number of OFDM symbols with a new (different) numerology (e.g., half or quarter of legacy symbol duration). The numerology of different EHT-STFs (or the rest of PPDU including EHT-STF, EHT-LTF and data fields) used in different BSSs corresponding to multiple APs, and/or the durations of extended EHT-STFs may be negotiated between multiple APs (assuming the preamble aligned transmissions are from multiple APs). The duration of an extended EHT field may be different from one PPDU to another. The duration of an extended EHT-STF may be signaled in USIG field or EHT field. In one example, explicit signaling of the duration (or existence) of an extended EHT-STF may not needed. A receiving STA may perform auto-correlation or other types of detection technology to detect the end of the EHT-STF. Since the end of the EHT-STF is synchronized among PPDUs, the OFDM symbol boundaries are aligned from one PPDU to another.

A purpose of the EHT-STF and extended EHT-STF may be to improve automatic gain control estimation in MIMO transmissions and synchronization or alignment among multiple PPDUs transmitted concurrently in different channel/links from one or more STAs and/or APs. The EHT-STF may have a fixed duration (e.g., an unvarying amount of time from one PPDU to another PPDU). The extended EHT-STF may be a variable duration (e.g., an amount of time that may vary from one PPDU to another PPDU). The value may be based on PPDU alignment negotiation (e.g., before or during transmission the PPDU(s)). Although the EHT-STF and the extended EHT-STF are described herein as separated fields, the EHT-STF and the extended EHT-STF may a single field.

Figures 22, 23:
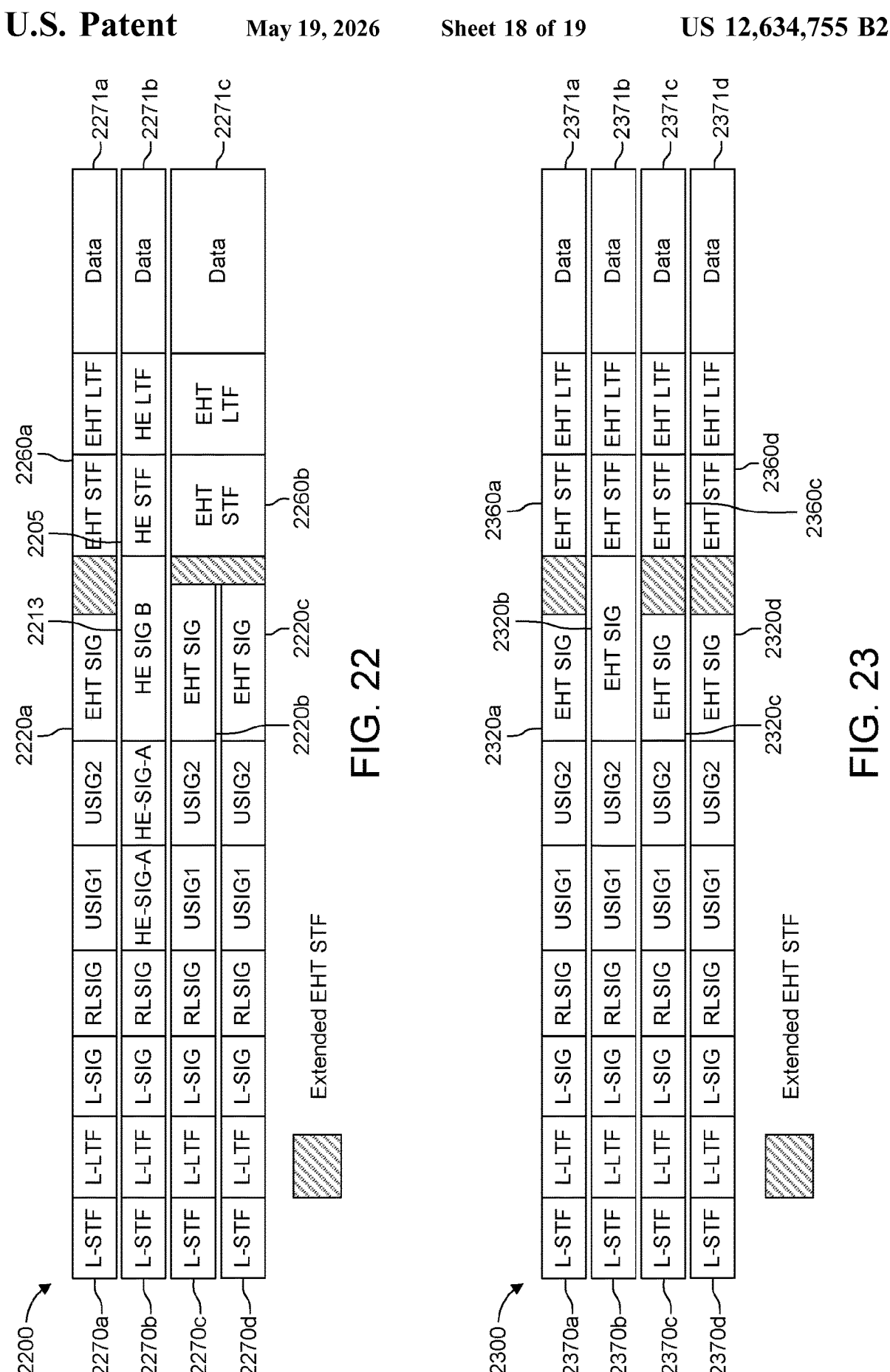
FIG. 22 illustrates an example of preamble alignment in multi segment aggregated transmissions based on extended STF fields.
FIG. 23 illustrates an example of preamble alignment in C-OFDMA transmissions based on extended STF fields.

FIG. 22 illustrates an example of preamble alignment in multi segment aggregated transmissions based on extended STF fields. In the example shown in FIG. 22, four subchannels/bandwidth (sub)segments 2270a-d are aggregated for multiple segment transmissions from an AP. The AP may use the first subchannel/(sub)segment/(sub)segment 2270a to transmit a first PPDU 2271a to a group of EHT STAs. The AP may use the second subchannel/(sub)segment/(sub)segment 2270b to transmit a second PPDU 2271b to a group of HE STAs. The AP may use third and fourth subchannels/ bandwidth (sub)segments 2270*c-d* to transmit a third PPDU 2271*c* to a group of EHT STAs. The corresponding EHT-SIG fields 2220*a*, 2220*b*, 2220*c* and HE SIG B field 2213 may have variable sizes. In this example, the HE SIG B field 2213 in the second PPDU 2271*b* may have the longest transmission duration. The normal HE STF 2205 may follow the HE SIG B field 2213. The AP may determine that the EHT-SIG field 2220*a* in the first PPDU 2271*a* may be X nanoseconds ("ns") (where X>0) shorter in duration than HE SIG B field 2213 in the second PPDU 2271*b*. The AP may insert one or more extended EHT-STFs totaling the X ns after the EHT-SIG field 2220*a* and prior to EHT-STF 2260*a* in the time domain. The AP may determine that the EHT-SIG fields 2220*b*, 2220*c* in the third PPDU 2271*c* may be Y ns (where Y>0) shorter in duration than HE SIG B field 2213 in the second PPDU 2271*b*. The AP may insert one or more extended EHT-STFs totaling the Y ns after the EHT-SIG fields 2220*b*, 2220*c* and prior to EHT-STFs 2260*b* (or 2260*b/c* depending on numerology) in the time domain.

FIG. 23 illustrates an example of preamble alignment in C-OFDMA transmissions based on extended STF fields. In the example shown in FIG. 23, four subchannels/bandwidth (sub)segments 2370*a-d* are used for C-OFDMA transmissions. A first AP("AP1") may use the first subchannel/(sub) segment 2370*a* to transmit a first PPDU 2371*a* to a group of EHT STAs. A second AP ("AP2") may use the second subchannel/(sub)segment 2370*b* to transmit a second PPDU 2371*b* to a group of EHT STAs. A third AP ("AP3") may use the third subchannel/(sub)segment 2370*c* to transmit a third PPDU 2371*c* to a group of EHT STAs. A fourth AP ("AP4") may use a fourth subchannel/(sub)segment 2370*d* to transmit a fourth PPDU 2371*d* to a group of EHT STAs. The four APs may negotiate respective EHT-SIG field durations before the transmission, and thus, know (i) that the EHT-SIG with longest duration is the EHT-SIG of the second PPDU 2371*b* and (ii) the exact size of EHT-SIG 2371*b*. The AP1, AP3, and AP4 may calculate respective durations for extended EHT-STFs for their PPDUs based on the size of EHT-SIG 2371*b* and may insert the extended EHT-STFs between EHT-SIG fields 2320*a*, 2320*c*, 2320*d* and EHT-STFs 2360*a*, 2360*c*, 2226*d*.

The EHT-STF sequence may produce a periodic signal in the time domain. The periodicity of the signal may be a fraction of an OFDM symbol duration. In various embodiments, the duration of the extended EHT-STF may be an integer multiple, or other function, of an EHT-STF period. For example, the extended EHT-STF may include M periodicities of the EHT-STF sequences in time domain. In various embodiments, the duration of the extended EHT-STF may be an integer multiple, or other function, of a fixed short period (e.g., a predefined fixed short period). For example, the extended EHT-STF may include M short periods of EHT-STF sequences in time domain. The extended EHT-STF may be repeated cyclically and prepended to the beginning of EHT-STFs.

The PPDU alignment negotiation may include, for example, any of the following operations. A sharing AP may acquire the media and may determine to share it with other (shared) APs for C-OFMDA transmissions. The sharing AP may transmit an indication ("a coordinated TXOP indication (CTI) frame") to one or more other APs to check whether the other APs are to participate in an upcoming C-OFDMA transmission. In various embodiments, the sharing AP may include in the CTI frame its frequency resource allocation and the EHT-SIG field size for the C-OFDMA transmission.

One or more of the other APs may transmit respective responses (e.g., "coordinated TXOP indication (CTR) frames") to the sharing AP. The CTR frame of a responding AP may indicate whether such AP is to participate in the C-OFDMA transmission. In various embodiments, a responding AP may include in the CTR frame of desired frequency resources and EHT-SIG field size.

After reception of CTR frames, the sharing AP may transmit a proposed schedule ("coordinated TXOP AP Schedule (CTAS) frame"). In various embodiments, the CTAS frame may include frequency resource allocations for the APs and the EHT-SIG field size In various embodiments, the CTAS may include a maximum EHT-SIG field duration for alignment purposes. The maximum EHT-SIG field duration may be determined (negotiated) through the use of a single or multiple CTI/CTR frame exchanges. Alternatively, the sharing AP may set it for the rest of the APs.

The APs participating in the C-OFDMA transmission may transmit a response ("a coordinated TXOP Local Schedule (CTLS) frame"). In various embodiments, a responding (shared) AP may include in the CTLS frame an EHT-SIG field size for its transmission. The EHT-SIG field size of the responding AP may be based on the frequency resources allocated to the AP in the CTAS frame.

The sharing AP may transmit a multi-AP trigger frame to trigger the concurrent C-OFDMA transmission. In various embodiments, the sharing AP may include the maximum EHT-SIG field duration in multi-AP trigger frame for alignment purposes (e.g., the inclusion of the maximum EHT-SIG field duration may be in addition to or in lieu of including it in the CTAS frame). The maximum EHT-SIG field duration may be used by the shared APs for alignment purposes. As disclosed above, the maximum EHT-SIG field duration may be determined (negotiated) through the use of a single or multiple CTI/CTR frame exchanges and/or may be set by the sharing AP.

The sharing and shared APs may transmit C-OFDMA transmissions using assigned frequency resources. In various embodiments, the EHT-SIG field might be limited by the maximum EHT-SIG field duration. If an AP may have a shorter EHT-SIG duration, the AP may use any disclosed methodologies and technologies to perform preamble alignment.

As will be understood by one of ordinary skill in the art, the preamble alignment procedure for C-OFDMA transmissions, including any of the PPDU alignment negotiation and other operations thereof, may be used to synchronize PPDUs transmitted from one AP, multiple APs, through one link or multiple links.

FIG. 24 is a flow chart illustrating an example flow 2400 for performing EHT PPDU transmissions. The flow 2400 may be suitable for carrying out EHT PPDU transmissions in accordance with the various embodiments disclosed herein above.

As shown. 24, an AP may generate an EHT PPDU having (i) a U-SIG field including first signaling to support a first set of features and information indicating that E-SIG is present in the EHT PPDU ("E-SIG present information"), and (ii) an EHT PPDU field including second signaling to support a second set of features and the E-SIG to support a third feature (2402). The AP may generate the EHT-PPDU based on a PPDU format defining a preamble comprising (i) a fixed duration U-SIG field, (ii) an EHT-SIG field, and (iii) an EHT short training field (EHT-STF). For example, the AP may generate the EHT-PPDU at least in part by (i) inserting, into the U-SIG field, first signaling to support a first set of features and information indicating that the E-SIG is present in the EHT PPDU, and (ii) inserting, into the EHT-SIG field, second signaling to support a second set of features and the E-SIG to support one or more third features.

In various embodiments, the E-SIG present information may be as small as a single bit and may be an E-SIG present (sub)field. In various embodiments, the E-SIG may be carried in an E-SIG field inserted into the EHT-SIG field. In various embodiments, the third features may include any of an optional feature and a feature supported by phase two release of IEEE 802.11be and not supported by phase one release of IEEE 802.11be. In various embodiments, the third features may be any of a HARQ transmission, a coordinated multi-AP (C-MAP) transmission and a midamble transmission. In various embodiments, the third features may include non-preamble physical layer signaling. In various embodiments, the non-preamble physical layer signaling may include one or more reference signals. In various embodiments, the one or more reference signals may include a midamble.

The AP may transmit the EHT PPDU (2404). For example, the AP may transmit (a) at least the U-SIG and EHT-SIG fields on resources of a first bandwidth segment, followed by (b) the EHT-STF on at least one of (i) the resources of the first bandwidth segment and (ii) resources of a second bandwidth segment, followed by (c) an EHT data field on at least one of (i) the resources of the first bandwidth segment and (ii) the resources of the second bandwidth segment.

In various embodiments, the AP may selectively include any of the E-SIG present information and the E-SIG on a PPDU-to-PPDU basis. For example, the AP may determine whether to selectively include any of the E-SIG present information and the E-SIG based on whether any of the third features are applicable to a current PPDU or other upcoming transmission. For example, the AP may include the E-SIG present information and the E-SIG if the E-SIG for any of the third features is needed for a current PPDU transmission and/or an upcoming transmission (e.g., an upcoming transmission where the E-SIG will not be provided between a current PPDU and such transmission). Alternatively, the AP might not include E-SIG present information and/or the E-SIG if the E-SIG for any of the third features is needed for a current PPDU transmission and/or an upcoming transmission (e.g., an upcoming transmission where the E-SIG will be provided between the current PPDU and such transmission).

In various embodiments, the AP may generate information to null a second subchannel of the multiple subchannels during transmission of the E-SIG, and/or may transmit that information on the second subchannel when transmitting the E-SIG. In various embodiments, the AP may generate a replica of at least one of the U-SIG and EHT-SIG fields for each of the multiple subchannels other than the first subchannel, and/or may transmit the replicas on the corresponding subchannels.

FIG. 25 is a flow chart illustrating an example flow 2500 for performing EHT PPDU transmissions. The flow 2500 may be suitable for carrying out EHT PPDU transmissions in accordance with the various embodiments disclosed herein above. The flow 2500 of FIG. 25 is similar to the flow 2400 of FIG. 24 and the disclosures accompanying the flow 2400 of FIG. 24 are applicable to the flow 2500 of FIG. 5. The flow 2500 of FIG. 25 may be considered as a special case of the embodiments disclosed above in connection with the flow 2400 of FIG. 24. The special case concerns (e.g., results from) the AP transmitting the EHT PPDU concurrently with another PPDU, where the AP may carry out any of various procedures (as disclosed herein) to cause the EHT PPDU and the other PPDU to align at boundaries of an EHT-STF and a STF of the other PPDU (2504). As an example, the AP may determine first and second durations of the EHT-SIG field and a signaling field of the other PPDU, and/or may adjust one or more of the first and second durations to align the EHT PPDU and the other PPDU at the first and second boundaries of the EHT-STF and the STG of the other PPDU, respectively. In various embodiments, the AP may adjust the first (second) duration at least in part by prepending additional training signals to the EHT-STF (the STF of the other PPDU). In various embodiments, the first and second boundaries may occur on an OFDM symbol boundary.

The other PPDU may be an EHT-PPDU (with or without E-SIG present information and E-SIG) or another type of PPDUs. In various embodiments, the AP may transmit at least a preamble of the other PPDU on a subsegment of the first bandwidth segment. In various embodiments, the AP may transmit the STF of the other PPDU on at least one of (i) the resources of the first bandwidth segment and (ii) resources of a second bandwidth segment. In various embodiments, the AP may transmit the EHT PPDU concurrently with more than one other PPDU, and the AP may carry out any of various procedures (as disclosed herein) to cause the EHT PPDU and the others PPDU to align at boundaries of the EHT-STF and respective STFs of the other PPDUs.

FIG. 26 is a flow chart illustrating an example flow 2600 for performing EHT PPDU transmissions. The flow 2600 may be suitable for carryout EHT PPDU transmissions in accordance with the various embodiments disclosed herein above. The flow 2600 of FIG. 26 is similar to the flow 2400 of FIG. 24 and the disclosures accompanying the flow 2400 of FIG. 24 are applicable to the flow 2600 of FIG. 26. The flow 2600 of FIG. 26 may be considered as a special case of the embodiments disclosed above in connection with the flow 2400 of FIG. 24. The special case concerns (e.g., results from) the AP generating an EHT PPDU also having ordered user block fields (2602) and/or transmitting the EHT PPDU with the ordered user block fields (2604). The ordered user block fields may include first and second (e.g., primary and secondary) user block fields, and the AP may carry out ordering the first and second user block fields in accordance with any of various procedures as disclosed herein. For example, the AP may generate a first user block field indicating a first RU of the first (e.g., primary) bandwidth segment that may be allocated to a first STA and a second user block field indicating a second RU of the second (e.g., secondary) bandwidth segment that is allocated to a second STA. The AP may then transmit the second user block field followed by the first user block field (e.g., to allow the STA sufficient time to switch/adjust its receive bandwidth before receiving the EHT-STF).

FIG. 27 is a flow chart illustrating an example flow 2700 for performing EHT PPDU transmissions. The flow 2600 may be suitable for carryout EHT PPDU transmissions in accordance with the various embodiments disclosed herein above. The flow 2700 of FIG. 27 is similar to the flows 2500, 2600 of FIGS. 25 and 26, respectively, and the disclosures accompanying the flows 2500, 2600 are applicable to the flow 2700 of FIG. 27. The flow 2700 of FIG. 27 may be considered a special case of the embodiments disclosed above in connection with the flows 2500, 2600. The special case concerns (e.g., results from) from the AP generating an EHT PPDU having ordered user block fields (2702) and/or transmitting the EHT PPDU with the ordered user block fields concurrently with another PPDU, where the AP may carry out any of various procedures (as disclosed herein) to cause the EHT PPDU and the other PPDU to align at boundaries of an EHT-STF and a STF of the other PPDU (2704).

Incorporated Herein by Reference are:

IEEE Std 802.11™-2016: Wireless LAN Medium Access Control (MAC) and Physical Layer (PHY) Specifications "IEEE P802.11ax™/D3.0, Amendment 6: Enhancements for High Efficiency WLAN", 2018.

IEEE 802.11-16/1045r9 "A PAR Proposal for Wake-up Radio", July 2016

11-18-0861 NGV Project Authorization Request (PAR)

11-18-0862 NGV Criteria for Standard Developement (CSD)

11-19-0497 TGbd Spec Framework Document (SFD)

IEEE 802.11-18/1231r4, "802.11 EHT Proposed PAR"

IEEE 802.11-18/1233r4, "IEEE 802.11 EHT draft Proposed CSD"

IEEE 802.11-19/1021r1, "Preamble Design Harmonization"

IEEE 802.11-19/1023, "Revisiting HARQ Complexity"

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU;

(iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶6 or means-plus-function claim format, and any claim without the terms "means for" is not so intended.

What is claimed is:

1. A method comprising:
generating an extremely high throughput (EHT) physical (PHY) layer protocol data unit (PDU) (PPDU) comprising a preamble, wherein the preamble comprises (I) a fixed duration universal signaling (U-SIG) field, (ii) an EHT-SIG (EHT-SIG) field, and (iii) an EHT short training field (EHT-STF), wherein the EHT-SIG field comprises signaling, and the signaling supports one or more features; and
transmitting (I) at least the U-SIG and EHT-SIG fields on resources of a first bandwidth segment, and (ii) the EHT-STF on any of the resources of the first bandwidth segment and resources of a second bandwidth segment, wherein the EHT PPDU and another PPDU transmitted concurrently with the EHT PPDU align at first and second boundaries of the EHT-STF and a short training field of the other PPDU, respectively.

2. The method of claim 1, wherein generating the EHT PPDU comprises: generating information to null at least one subsegment of the first bandwidth segment during transmission of at least the U-SIG and EHT-SIG fields, the method comprising: applying the information to null the at least one subsegment prior to transmitting the U-SIG and EHT-SIG fields on the resources of the first bandwidth segment.

3. The method of claim 1, wherein generating the EHT PPDU comprises: generating a replica of at least one of the U-SIG and EHT-SIG fields, and the method comprising: transmitting the replica on resources of at least one subsegment of the first bandwidth segment during transmission of the corresponding at least one of the U-SIG and EHT-SIG fields.

4. The method of claim 1, wherein generating the EHT PPDU comprises:
generating a first user block field indicating a first resource unit (RU) of the first bandwidth segment allocated to a first STA; and
generating a second user block field indicating a second RU of the second bandwidth segment allocated to a second STA; and
transmitting the EHT-SIG field comprises transmitting the second user block field followed by the first user block field.

5. The method of claim 1, comprising transmitting the other PPDU concurrently with the EHT PPDU.

6. The method of claim 5, wherein at least a preamble of the other PPDU is transmitted on a subsegment of the first bandwidth segment.

7. The method of claim 1, wherein the EHT-SIG field and the signaling field of the other PPDU have first and second durations, respectively, the method comprising:

adjusting at least one of the first and second durations to align the EHT PPDU and the other PPDU at the first and second boundaries.

8. The method of claim 7, wherein adjusting at least one of the first and second durations comprises:

prepending additional training signals to the corresponding at least one of the EHT-STF and the short training field of the other PPDU.

9. The method of claim 1, wherein the first and second boundaries occur on an OFDM symbol boundary.

10. The method of claim 1, wherein at least one of:

(i) the signaling comprises user-specific information and/or common information;

(ii) the signaling is carried in an signaling (E-SIG) field of the EHT-SIG field;

(iii) the U-SIG field comprises first signaling, the first signaling supports a first set of features, the EHT-SIG field comprises second signaling, the second signaling supports a second set of features, and the method comprises determining that the one or more features are not supported by the first signaling and the second signaling;

(iv) the transmission of the U-SIG and EHT-SIG fields uses a first numerology, transmission of the EHT data field uses a second numerology, and the first and second numerologies are different;

(v) the one or more features comprise any of a hybrid automatic repeat request (HARQ) transmission, a coordinated multi-AP (C-MAP) transmission and a midamble transmission;

(vi) the one or more features comprise any of an optional feature and a feature supported by phase two release of IEEE 802.11be and not supported by phase one release of IEEE 802.11be;

(vii) the one or more features comprise non-preamble physical layer signaling;

(viii) the non-preamble physical layer signaling comprises one or more reference signals; and (ix) the one or more reference signals comprise a midamble.

11. A station (STA) comprising circuitry, including a transmitter, a receiver, a processor and memory, configured to:

generate an extremely high throughput (EHT) physical (PHY) layer protocol data unit (PDU) (PPDU) comprising a preamble, wherein the preamble comprises (i) a fixed duration universal signaling (U-SIG) field, (ii) an EHT-SIG (EHT-SIG) field, and (iii) an EHT short training field (EHT-STF), wherein the EHT-SIG field comprises the signaling, and wherein the signaling supports one or more features; and transmit (i) at least the U-SIG and EHT-SIG fields on resources of a first bandwidth segment, and (ii) the EHT-STF on any of the resources of the first bandwidth segment and resources of a second bandwidth segment wherein the EHT PPDU and another PPDU transmitted concurrently with the EHT PPDU align at first and second boundaries of the EHT-STF and a short training field of the other PPDU, respectively.

12. The STA of claim 11, wherein the circuitry being configured to generate the EHT PPDU comprises the circuitry being configured to generate information to null at least one subsegment of the first bandwidth segment during transmission of at least the U-SIG and EHT-SIG fields, and wherein the circuitry is configured to apply the information to null the at least one subsegment prior to transmitting the U-SIG and EHT-SIG fields on the resources of the first bandwidth segment.

13. The STA of claim 11, wherein the circuitry being configured to generate the EHT PPDU comprises the circuitry being configured to generate a replica of at least one of the U-SIG and EHT-SIG, and wherein the circuitry is configured to transmit the replica on resources of at least one subsegment of the first bandwidth segment during transmission of the corresponding at least one of the U-SIG and EHT-SIG fields.

14. The STA of claim 11, wherein the circuitry being configured to generate the EHT PPDU comprises the circuitry being configured to:

generate a first user block field indicating a first resource unit (RU) of the first bandwidth segment allocated to a first STA; and generate a second user block field indicating a second RU of the second bandwidth segment allocated to a second STA; and the circuitry being configured to transmit the EHT-SIG field comprises the circuitry being configured to transmit the second user block field followed by the first user block field.

15. The STA of the claims 11, wherein the circuitry is configured to transmit the other PPDU concurrently with the EHT PPDU.

16. The STA of claim 15, wherein at least a preamble of the other PPDU is transmitted on a subsegment of the first bandwidth segment.

17. The STA of claim 11, wherein the EHT-SIG field and the signaling field of the other PPDU have first and second durations, respectively, and wherein the circuitry is configured to: adjust at least one of the first and second durations to align the EHT PPDU and the other PPDU at the first and second boundaries.

18. The STA of claim 17, wherein the circuitry being configured to adjust at least one of the first and second durations comprises the circuitry being configured to prepend additional training signals to the corresponding at least one of the EHT-STF and the short training field of the other PPDU.

19. The STA of claim 11, wherein the first and second boundaries occur on an OFDM symbol boundary.

20. The STA of claim 11, wherein at least one of:

(i) the signaling comprises user-specific information and/or common information;

(ii) the signaling is carried in an signaling (E-SIG) field of the EHT-SIG field;

(iii) the U-SIG field comprises first signaling, the first signaling supports a first set of features, the EHT-SIG field comprises second signaling, the second signaling supports a second set of features, and the circuitry is configured to determine that the one or more features are not supported by the first signaling and the second signaling;

(iv) the transmission of the U-SIG and EHT-SIG fields uses a first numerology, transmission of the EHT data field uses a second numerology, and the first and second numerologies are different;

(v) the one or more features comprise any of a hybrid automatic repeat request (HARQ) transmission, a coordinated multi-AP (C-MAP) transmission and a midamble transmission;

(vi) the one or more features comprise any of an optional feature and a feature supported by phase two release of IEEE 802.11be and not supported by phase one release of IEEE 802.11be;

(vii) the one or more features comprise non-preamble physical layer signaling;

(viii) the non-preamble physical layer signaling comprises one or more reference signals;

(ix) the one or more reference signals comprise a midamble; and (x) the STA comprises as an access point.

\* \* \* \* \*